United States Patent
Fujiwara

(10) Patent No.: US 10,728,871 B2
(45) Date of Patent: Jul. 28, 2020

(54) EVALUATION APPARATUS AND METHOD

(71) Applicant: TOSHIBA TEC KABUSHIKI KAISHA, Shinagawa-ku, Tokyo (JP)

(72) Inventor: Akihiko Fujiwara, Kawasaki Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/243,144

(22) Filed: Jan. 9, 2019

(65) Prior Publication Data

US 2019/0223137 A1 Jul. 18, 2019

(30) Foreign Application Priority Data

Jan. 17, 2018 (JP) .................... 2018-005566

(51) Int. Cl.
*H04W 64/00* (2009.01)
*H04W 52/24* (2009.01)
*H04W 52/36* (2009.01)
*H04W 52/14* (2009.01)
*H04B 17/318* (2015.01)

(52) U.S. Cl.
CPC ......... *H04W 64/00* (2013.01); *H04W 52/146* (2013.01); *H04W 52/245* (2013.01); *H04W 52/36* (2013.01); *H04B 17/318* (2015.01)

(58) Field of Classification Search
CPC ... H04W 64/00; H04W 16/18; H04W 64/003; H04B 17/318
See application file for complete search history.

(56) References Cited

U.S. PATENT DOCUMENTS

| | | | |
|---|---|---|---|
| 9,723,510 B1* | 8/2017 | Beluri | H04W 24/10 |
| 10,036,798 B1 | 7/2018 | Uchida et al. | |
| 2018/0275243 A1 | 9/2018 | Uchida et al. | |
| 2019/0297673 A1* | 9/2019 | Xue | H04W 4/70 |

* cited by examiner

*Primary Examiner* — Jaime M Holliday
(74) *Attorney, Agent, or Firm* — Amin, Turocy & Watson, LLP

(57) ABSTRACT

According to one embodiment, a base station as a verification target and a partner base station to be a set of a two-point positioning scheme with the base station as the verification target are detected from a list. It is determined whether the partner base station is already selected as the base station as the verification target. When the detected partner base station is not selected yet, and the detected partner base station is already selected, it is determined whether the base station as the verification target is included in the adjacent candidate base stations with respect to the partner base station. When the base station as the verification target is included in the adjacent candidate base stations, the base station as the verification target and the partner base station, which is determined to be already selected, are confirmed as a pair of base stations.

17 Claims, 14 Drawing Sheets

| BEACON ID | MAP CODE | INSTALLATION COORDINATE | CORRECTION VALUE | RECEPTION THRESHOLD VALUE | POSITIONING SCHEME | ADJACENT ID | |
|---|---|---|---|---|---|---|---|
| B00 | MAP1 | 220,400 | 0 | X | ONE-POINT | | ← d1 |
| B01 | MAP1 | 215,370 | +5 | −70 | TWO-POINT | B02 B03 B05 | ← d2 |
| B02 | MAP1 | 230,300 | −5 | −70 | TWO-POINT | B01 | ← d3 |
| B03 | MAP1 | 270,450 | 0 | −70 | TWO-POINT | B04 | ← d4 |
| B04 | MAP1 | 290,360 | 0 | −70 | TWO-POINT | B03 B05 | ← d5 |
| B05 | MAP1 | 300,280 | −10 | −70 | TWO-POINT | B02 B04 B06 | ← d6 |
| B06 | MAP1 | 300,280 | 0 | −70 | TWO-POINT | B05 | ← d7 |
| B07 | MAP2 | 20,30 | 0 | − | THREE-POINT | | ← d8 |
| B08 | MAP2 | 50,60 | 0 | − | THREE-POINT | | ← d9 |
| ⋮ | ⋮ | ⋮ | ⋮ | ⋮ | ⋮ | ⋮ | |

| MAP CODE | | MAP1 | |
|---|---|---|---|
| TARGET ID | ADJACENT SETTING ID | ADJACENT CANDIDATE ID | ADJACENT CONFIRMATION ID |
| B01 | B02  B03  B05 | | |
| B02 | B01 | | |
| B03 | B04 | | |
| B04 | B03  B05 | | |
| B05 | B02  B04  B06 | | |
| B06 | B05 | | |
| ⋮ | ⋮ | ⋮ | ⋮ |

| MAP CODE | | MAP1 | |
|---|---|---|---|
| FIRST ID | SECOND ID | BIDIRECTIONAL F | ERROR F |
| | | | |
| | | | |
| | | | |
| | | | |
| | | | |
| | | | |
| ⋮ | | | |

| MAP CODE | MAP1 | | |
|---|---|---|---|
| TARGET ID | ADJACENT SETTING ID | ADJACENT CANDIDATE ID | ADJACENT CONFIRMATION ID |
| B01 | B02  B03  B05 | B02  B03  B05 | |
| F11 | F12 | F13 | F14 |

| MAP CODE | MAP1 | | |
|---|---|---|---|
| TARGET ID | ADJACENT SETTING ID | ADJACENT CANDIDATE ID | ADJACENT CONFIRMATION ID |
| B01 | B02  B03  B05 | B02  B03  B05 | B02 |
| B02 | B01 | | B01 |
| F11 | F12 | F13 | F14 |

| MAP CODE | MAP1 | | |
|---|---|---|---|
| TARGET ID | ADJACENT SETTING ID | ADJACENT CANDIDATE ID | ADJACENT CONFIRMATION ID |
| B01 | B02  B03  B05 | B02  B03  B05 | B02 |
| B02 | B01 | | B01 |
| B03 | B04 | B04 | |
| F11 | F12 | F13 | F14 |

| MAP CODE | MAP1 | | |
|---|---|---|---|
| TARGET ID | ADJACENT SETTING ID | ADJACENT CANDIDATE ID | ADJACENT CONFIRMATION ID |
| B01 | B02 B03 B05 | B02 B03 B05 | B02 |
| B02 | B01 | | B01 |
| B03 | B04 | B04 | B04 |
| B04 | B03 B05 | B05 | B03 |

| MAP CODE | MAP1 | | |
|---|---|---|---|
| TARGET ID | ADJACENT SETTING ID | ADJACENT CANDIDATE ID | ADJACENT CONFIRMATION ID |
| B01 | B02 B03 B05 | B02 B03 B05 | B02 |
| B02 | B01 | | B01 |
| B03 | B04 | B04 | B04 |
| B04 | B03 B05 | B05 | B03 B05 |
| B05 | B02 B04 B06 | B02 B06 | B04 |

| MAP CODE | MAP1 | | |
|---|---|---|---|
| TARGET ID | ADJACENT SETTING ID | ADJACENT CANDIDATE ID | ADJACENT CONFIRMATION ID |
| B01 | B02 B03 B05 | B02 B03 B05 | B02 |
| B02 | B01 | | B01 |
| B03 | B04 | B04 | B04 |
| B04 | B03 B05 | B05 | B03 B05 |
| B05 | B02 B04 B06 | B02 B06 | B04 B06 |
| B06 | B05 | | B05 |
| F11 | F12 | F13 | F14 |

FIG. 18

| MAP CODE | MAP1 | | |
|---|---|---|---|
| FIRST ID | SECOND ID | BIDIRECTIONAL F | ERROR F |
| B01 | B02 | 1 | 0 |
| B01 | B03 | 0 | 0 |
| B01 | B05 | 0 | 1 |
| B03 | B04 | 1 | 0 |
| B04 | B05 | 1 | 0 |
| B05 | B02 | 0 | 0 |
| B05 | B06 | 1 | 0 |
| F21 | F22 | F23 | F24 |

| BEACON ID | MAP CODE | INSTALLATION COORDINATE | CORRECTION VALUE | RECEPTION THRESHOLD VALUE | POSITIONING SCHEME | ADJACENT ID | | |
|---|---|---|---|---|---|---|---|---|
| B00 | MAP1 | 220,400 | 0 | X | ONE-POINT | | | |
| B01 | MAP1 | 215,370 | +5 | -70 | TWO-POINT | B02 | B03 | |
| B02 | MAP1 | 230,300 | -5 | -70 | TWO-POINT | B01 | B05 | |
| B03 | MAP1 | 270,450 | 0 | -70 | TWO-POINT | B04 | B01 | |
| B04 | MAP1 | 290,360 | 0 | -70 | TWO-POINT | B03 | B05 | |
| B05 | MAP1 | 300,280 | -10 | -70 | TWO-POINT | B02 | B04 | B06 |
| B06 | MAP1 | 300,280 | 0 | -70 | TWO-POINT | B05 | | |
| B07 | MAP2 | 20,30 | 0 | - | THREE-POINT | | | |
| B08 | MAP2 | 50,60 | 0 | - | THREE-POINT | | | |
| ⋮ | ⋮ | ⋮ | ⋮ | ⋮ | ⋮ | ⋮ | | |

EVALUATION APPARATUS AND METHOD

CROSS-REFERENCE TO RELATED APPLICATIONS

This application is based upon and claims the benefit of priority from Japanese Patent Application No. P2018-005566, filed on Jan. 17, 2018, the entire contents of which are incorporated herein by reference.

FIELD

Embodiments described herein relate generally to an evaluation apparatus that evaluates a list in which partner base stations are respectively set, each of which may be a set of a two-point positioning scheme with a base station, in association with a plurality of base stations installed in an area where a mobile station moves, and a method of causing a computer to function as the evaluation apparatus.

BACKGROUND

In the related art, there is known a positioning apparatus that measures a position of a positioning target using wireless communication technology. This type of positioning apparatus includes a mobile station that moves together with the positioning target, and the mobile station measures radio wave reception intensity when radio waves transmitted from a base station provided in a predetermined place, for example, beacons, are received. The positioning apparatus acquires a measurement value of the radio wave reception intensity from the mobile station, that is, a so-called RSSI value, calculates a distance between the mobile station and the base station from the RSSI value, and specifies a position of the positioning target based on one piece or a plurality of pieces of distance information.

In general, a scheme for specifying a position of a positioning target based on one piece of distance information is called a one-point positioning scheme. A scheme for specifying a position of a positioning target based on two pieces of distance information is called a two-point positioning scheme. A scheme for specifying a position of a positioning target based on three pieces of distance information is called a three-point positioning scheme.

In the case of the two-point positioning scheme, a positioning apparatus specifies a position on a line segment connecting two base stations to each other with a straight line. Therefore, it is necessary to set, in the positioning apparatus, that the two base stations are a pair, whereby the positioning apparatus can recognize that the two base stations are located at both ends of the line segment. For the setting, a list is used in which partner base stations are respectively set, each of which may be a set of the two-point positioning scheme with a base station, in association with a plurality of base stations.

Normally, the list is artificially generated by a person in charge. Therefore, after setting the other base station as a partner base station for one base station, sometimes the person in charge forgets to set the one base station as a partner base station for the other base station. Also, improper setting may be made sometimes such as that a line segment connecting two paired base stations to each other is set to cross over an obstacle. When an area where positioning is performed is wide or there is an obstacle, a plurality of base stations are provided in the area. In such a case, since the list is very complicated, setting errors increase. Accordingly, an apparatus capable of evaluating the consistency of the list is required.

DESCRIPTION OF THE DRAWINGS

FIG. 4 is a schematic diagram illustrating a data structure of an analysis table;

FIG. 5 is a schematic diagram illustrating a data structure of a verification table;

FIG. 12 is a schematic diagram illustrating a transition example of data stored in the analysis table;

FIG. 13 is a schematic diagram illustrating a transition example of the data;

FIG. 14 is a schematic diagram illustrating a transition example of the data;

FIG. 15 is a schematic diagram illustrating a transition example of the data;

FIG. 16 is a schematic diagram illustrating a transition example of the data;

FIG. 17 is a schematic diagram illustrating a transition example of the data;

FIG. 18 is a schematic diagram illustrating an example of data stored in an evaluation table;

DETAILED DESCRIPTION

An exemplary embodiment provides an evaluation apparatus capable of evaluating consistency of a list in which partner base stations are respectively set, each of which is to be a set of a two-point positioning scheme with a base station, in association with a plurality of base stations.

In general, according to one embodiment, an evaluation apparatus includes selection means, detection means, first determination means, storage means, second determination means, confirmation means, and first notification means. The selection means selects a base station as a verification target from a list in which partner base stations are respectively set, each of which is to be a set of a two-point positioning scheme with a base station, in association with a plurality of base stations installed in an area where a mobile station moves. The detection means detects the partner base station, which is the set of the two-point positioning scheme with the base station as the verification target selected by the selection means, from the list. The first determination means determines whether the partner base station detected by the detection means is already selected as the base station as the verification target by the selection means. The storage means stores the partner base station as adjacent candidate base stations with respect to the base station as the verification target when the first determination means determines that the detected partner base station is not selected yet. The second determination means determines whether the base station as the verification target is included in the adjacent candidate base stations with respect to the partner base station when the first determination means determines that the detected partner base station is already selected. The confirmation means confirms the base station as the verification target and the partner base station, which is determined by the first determination means to be already selected, as a pair of base stations which are the set of the two-point positioning scheme when the second determination means determines that the base station as the verification target is included in the adjacent candidate base stations. The first notification means notifies the pair of base stations confirmed by the confirmation means.

Hereinafter, an embodiment of an evaluation apparatus capable of evaluating consistency of a list in which partner base stations are respectively set, each of which is to be a set of a two-point positioning scheme with a base station, in association with a plurality of base stations will be described with reference to the drawings.

Figure 1:
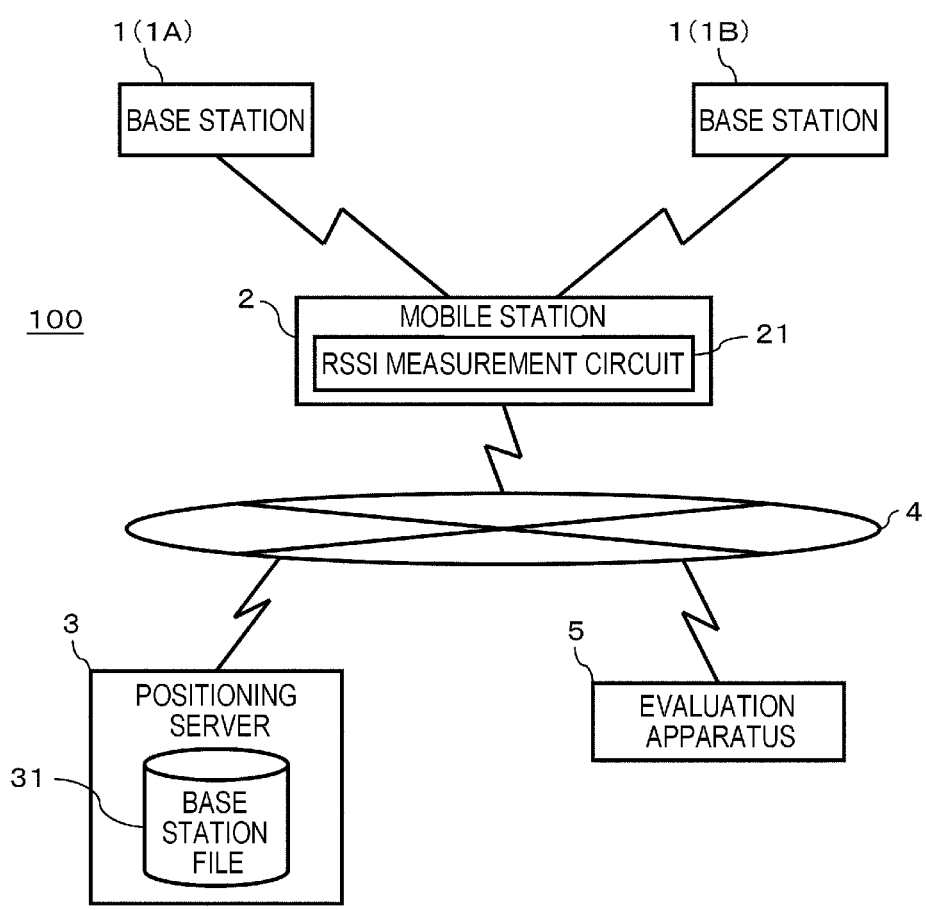
FIG. 1 is a block diagram illustrating a schematic configuration of a positioning system of an embodiment.

The embodiment exemplifies an evaluation apparatus 5 with respect to a positioning system 100 that measures a position of a mobile station moving in a positioning area by using wireless communication technology as illustrated in FIG. 1. Firstly, the positioning system 100 will be described. The positioning system 100 employs a floor of a factory, a store and the like as a positioning area and employs a moving body moving in this positioning area as a positioning target. The floor may be only one floor or may be prepared across a plurality of floors. Typically, the moving body is a vehicle, an article transported by a vehicle and the like, and the like.

FIG. 1 is a block diagram illustrating a schematic configuration of the positioning system 100. The positioning system 100 includes a plurality of base stations 1, a mobile station 2, a positioning server 3, and a network 4.

The base stations 1 are respectively installed at predetermined positions in a positioning area. FIG. 1 illustrates only two base stations 1; however, actually, many base stations 1 are provided in the positioning area in consideration of a positioning environment such as an area of the positioning area and the presence or absence of an obstacle. The base station 1 is a fixed station. The base station 1, for example, conforms to a short range radio communication standard such as Bluetooth (registered trademark) and periodically transmits a beacon signal. That is, the base station 1 is an originating station of the beacon signal. The beacon signal includes a unique beacon ID. The beacon ID is an ID uniquely set in each base station 1 that transmits the beacon signal including the beacon ID. That is, the base station 1 can be specified by the beacon ID. The base stations transmit the beacon signal at approximately the same transmission intensity in principle. The base stations 1 may intentionally change the transmission intensity according to peripheral environments.

The mobile station 2 is carried by a moving body that moves in the positioning area. FIG. 1 illustrates only one mobile station 2; however, actually, the mobile station 2 exists in each moving body that moves in the positioning area. The mobile station 2 receives the beacon signal transmitted from the base station 1. That is, the mobile station 2 is a receiving station of the beacon signal. The mobile station 2 includes an RSSI measurement circuit 21. The mobile station 2 measures the radio wave reception intensity of the beacon signal by the RSSI measurement circuit 21. The mobile station 2 includes a radio unit (not illustrated) therein. The mobile station 2 is connected to the network 4 via the radio unit. The positioning server 3 is connected to the network 4, and the mobile station 2 performs data communication with the positioning server 3 via the network 4. The mobile station 2 transmits the value of the radio wave reception intensity of the beacon signal measured by the RSSI measurement circuit 21, a so-called RSSI value, to the positioning server 3 in association with the beacon ID of the beacon signal. Such a mobile station 2 typically is a portable information terminal such as a smart phone, a cellular phone, a tablet terminal, and a notebook computer. The network 4, for example, is a radio network of a WiFi (registered trademark) standard, a mobile communication network, and the like.

When data (the RSSI value+the beacon ID) of the RSSI value is received from the mobile station 2, the positioning server 3 calculates distance information r of the base station 1 specified from the beacon ID and the mobile station 2 by the following Equation (1). In Equation (1) below, "A" denotes an RSSI value obtained by measuring a radio wave signal of the base station 1 at a place separated by 1 m, and "B" denotes a constant (logically 2) of radio wave attenuation.

$$RSSI(r)=A-10*B/\log 10(r) \quad (1)$$

The positioning server 3 calculates a position of the mobile station 2 by using single piece or a plurality of pieces of distance information r. In the case of using the single piece of distance information r, the positioning server 3 calculates the position of the mobile station 2 by the one-point positioning scheme. For example, the positioning server 3 calculates the position of the mobile station 2 based on a base station 1 determined to be nearest the mobile station 2.

In the case of using the plurality of pieces of distance information r, the positioning server 3 calculates the position of the mobile station 2 by the two-point positioning scheme or the three-point positioning scheme. In the case of the two-point positioning scheme, the positioning server 3 specifies a point taking the ratio of the distance information r as the position of the mobile station 2 on a line segment connecting the two base stations 1 to each other. In the case of the three-point positioning scheme, the positioning server 3 specifies the position of the mobile station 2 by a general three-point measurement method. The positioning server 3 functions as a positioning apparatus including a positioning unit that measures the position of the mobile station 2 based on radio wave reception intensity.

Meanwhile, in the case of the two-point positioning scheme, in order to allow the positioning server 3 to be able to recognize that two base stations, for example, abase station 1A and a base station 1B are located at both ends of a line segment, it is necessary to set, in the positioning server 3, information indicating that the two base stations 1A and 1B are a pair of base stations of the two-point positioning scheme. Specifically, identification information on the other base station 1B is set in association with identification information on the one base station 1A, and the identification information on the one base station 1A is set in association with the identification information on the other base station 1B. The identification information uses beacon IDs of beacon signals transmitted from the base stations 1A and 1B. For this setting, the positioning server 3 stores a base station file 31 in a storage device. The storage device may be embedded in the positioning server 3 or may be provided outside the positioning server 3.

Figures 2, 3:
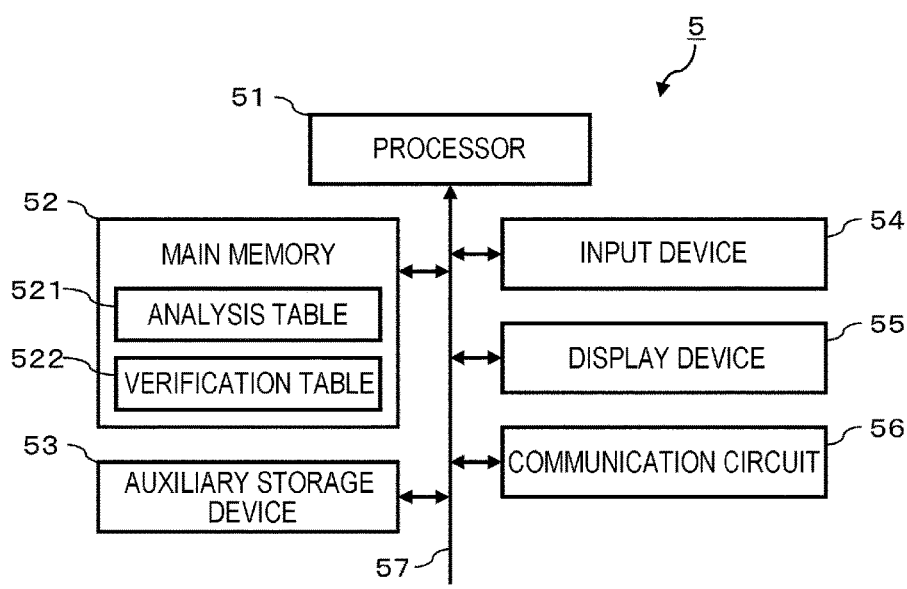
FIG. 2 is a schematic diagram illustrating an example of a base station file.
FIG. 3 is a block diagram illustrating a configuration of a main circuit in an evaluation apparatus.

FIG. 2 is a schematic diagram illustrating an example of the base station file 31. The base station file 31 sequentially stores data records configured with setting information on each base station 1 in each base station 1 by the number of base stations 1. The setting information includes at least items "beacon ID", "map code", "installation coordinate", "correction value", "reception threshold value", "positioning scheme", and "adjacent ID".

The item "beacon ID" stores a beacon ID included in the beacon signal transmitted from the base station 1. The positioning server 3 can determine whether data stored in another item of the same record is setting information on which base station 1 from the beacon ID stored in the item "beacon ID". That is, the items "map code", "installation coordinate", "correction value", "reception threshold value", "positioning scheme", and "adjacent ID" store setting information on the base station 1 (hereinafter, referred to as a corresponding base station 1) specified with the beacon ID stored in the item "beacon ID".

Specifically, the item "map code" stores an identification code of a data file stored with map image data indicating a positioning area where the corresponding base station 1 is installed. The storage device of the positioning server 3 stores a data file in which map image data of each floor was stored in association with the map code.

The item "installation coordinate" stores coordinate values (text data) that specify a position in the positioning area where the corresponding base station 1 is installed. For example, when the positioning area is regarded as a two dimensional X-Y plane, a position of the corresponding base station on the X-Y plane is indicated by a X coordinate value and a Y coordinate value of a pixel unit or a metric unit. The coordinate values stored in the item "installation coordinate" are the X coordinate value and the Y coordinate value.

The item "correction value" stores a value (text data) for correcting the radio wave reception intensity of the beacon signal transmitted from the corresponding base station 1. As described above, a plurality of base stations 1 transmit the beacon signals at approximately the same transmission intensity in principle. However, the intensities of the beacon signals may be different from those of other base stations by a constant value due to manufacturing quality variations or installation environments of the base stations 1. The value stored in the item "correction value" is a differential value thereof.

The item "reception threshold value" stores a threshold value (text data) for the RSSI value of the beacon signal transmitted from the corresponding base station 1. The RSSI value becomes large when a distance between the originating station (the base station 1) and the receiving station (the mobile station 2) is short, and becomes small when the distance is long. Information on a long distance more than necessary is not required for the positioning of a mobile body. The threshold value stored in the item "reception threshold value" is a maximum value of an RSSI value from which distance information not required for the positioning of the mobile body is derived. The threshold value may be set for each beacon ID, that is, each individual base station 1 or may be collectively set in units of positioning areas.

The item "positioning scheme" stores text data indicating a positioning scheme for which the beacon signal transmitted from the corresponding base station 1 is used. For example, when the beacon signal is used for the positioning of the one-point positioning scheme, text data "one point" is stored. When the beacon signal is used for the positioning of the two-point positioning scheme, text data "two-point" is stored. When the beacon signal is used for the positioning of the three-point positioning scheme, text data "three-point" is stored.

The item "adjacent ID" stores a beacon ID (text data) of a beacon signal transmitted from another base station 1 being a pair with the corresponding base station 1 when the beacon signal transmitted from the corresponding base station 1 is used for the positioning of the two-point positioning scheme. For example, when the position of the mobile station 2 is specified on a line segment of the two base stations 1A and 1B, the item "adjacent ID" of a data record for one base station 1A stores a beacon ID of a beacon signal transmitted from the other base station 1B as identification information on the other base station 1B. Furthermore, the item "adjacent ID" of a data record for the base station 1B stores a beacon ID of a beacon signal transmitted from the base station 1A as identification information on the one base station 1A.

Next, the evaluation apparatus 5 will be described. As illustrated in FIG. 1, the evaluation apparatus 5 is connected to the network 4 of the positioning system 100. The evaluation apparatus 5 is a computer apparatus that analyzes a list in which partner base stations are respectively set, each of which is to be a set of a two-point positioning scheme with a base station, in association with a plurality of base stations 1, and evaluates the consistency of the list. The list is configured with data set in the item "beacon ID" and the item "adjacent ID" of the base station file 31.

FIG. 3 is a block diagram illustrating a configuration of a main circuit in the evaluation apparatus 5. The evaluation apparatus 5 includes a processor 51, a main memory 52, an auxiliary storage device 53, an input device 54, a display device 55, a communication circuit 56, and a system transmission line 57. The system transmission line 57 includes an address bus, a data bus, a control signal line and the like. The system transmission line 57 connects the processor 51, the main memory 52, the auxiliary storage device 53, the input device 54, the display device 55, and the communication circuit 56 to one another.

The processor 51 corresponds to a central part of the evaluation apparatus 5. The processor 51 controls each part which should perform various functions of the evaluation apparatus 5 according to an operating system and an application program.

The main memory 52 corresponds to a main storage part of the evaluation apparatus 5. The main memory 52 includes a nonvolatile memory area and a volatile memory area. The main memory 52 stores the operating system, the application program and the like in the nonvolatile memory area. Furthermore, the main memory 52 stores data, which is required when the processor 51 performs processes for controlling each part, in the nonvolatile or volatile memory area. The main memory 52 uses the volatile memory area as a work area where the processor 51 appropriately rewrites data.

The auxiliary storage device 53 corresponds to an auxiliary storage part of the evaluation apparatus 5. For example, the auxiliary storage device 53 uses an electric erasable programmable read-only memory (EEPROM), a hard disc drive (HDD), a solid state drive (SSD) and the like.

The input device 54 is a touch panel, a mouse, a keyboard and the like. The display device 55 is a liquid crystal display, a LED display and the like. The input device 54 and the display device 55 serve as an interface with a user who analyzes the list by using the evaluation apparatus 5.

The communication circuit 56 is connected to the network 4. The processor 51 of the evaluation apparatus 5 performs data communication with the positioning server 3 via the communication circuit 56 and the network 4.

The evaluation apparatus 5 having such a configuration can store an analysis table 521 and a verification table 522 in the main memory 52.

FIG. 4 is a schematic diagram illustrating a data structure of the analysis table 521. As illustrated in FIG. 4, the analysis table 521 includes an area for storing map codes and four fields F11 to F14. The field F11 is an area for storing a target ID. The field F12 is an area for storing an adjacent setting ID. The field F13 is an area for storing an adjacent candidate ID. The field F14 is an area for storing an adjacent confirmation ID. Details of the IDs stored in the fields F11 to F14 will be described later.

FIG. 5 is a schematic diagram illustrating a data structure of the verification table 522. As illustrated in FIG. 5, the verification table 522 includes an area for storing map codes and four fields F21 to F24. The field F21 is an area for storing a first ID. The field F22 is an area for storing a second ID. The field F23 is an area for storing a bidirectional flag. The field F24 is an area for storing an error flag. Details of the IDs and the flags stored in the fields F21 to F24 will be described later.

FIGS. 6 to 10 are flowcharts illustrating the procedures of main information processing performed by the processor 51 of the evaluation apparatus 5 according to a program. The program is stored in the main memory 52 or the auxiliary storage device 53. Hereinafter, an operation of the evaluation apparatus 5 will be described with reference to FIGS. 6 to 10. The content of processes, which are illustrated in FIGS. 6 to 10 and are described below, is an example. If similar results can be obtained, the processing procedures and the processing content are not particularly limited.

Firstly, an operator of the evaluation apparatus 5 operates the input device 54 to execute the program. When the program is executed, the processor 51 of the evaluation apparatus 5 starts the information processing of the procedure illustrated in the flowchart of FIG. 6. Firstly, in Act 1, the processor 51 controls the communication circuit 56 to transmit a request command of the base station file 31 to the positioning server 3. The request command is transmitted to the positioning server 3 via the network 4. When the request command is received, the positioning server 3 transmits the base station file 31 stored in the storage device to the evaluation apparatus 5. The base station file 31 is transmitted to the evaluation apparatus 5 via the network 4. The processor 51 of the evaluation apparatus 5 having received the base station file 31 via the communication circuit 56 stores the base station file 31 in the auxiliary storage device 53.

By so doing, the processor 51 having acquired the base station file 31 to be evaluated performs analyzing in Act 2. The procedure of the analyzing will be described with reference to the flowcharts of FIGS. 7 and 8. That is, when the analyzing is made, the processor 51 resets a first addition counter n to "0" in Act 21 of FIG. 7. The first addition counter n, for example, is formed in the volatile area of the main memory 52.

In Act 22, the processor 51 counts up the first addition counter n by "1". In Act 23, the processor 51 checks whether an n-th (n is the counted value of the first addition counter n) data record exists in the base station file 31. When the n-th data record exists in the base station file 31 (Act 23, YES), the processor 51 reads the n-th data record in Act 24.

In Act 25, the processor 51 detects data of the item "positioning scheme" from the n-th data record. In Act 26, the processor 51 checks whether data of the detected item "positioning scheme" is the "two-point" indicating the two-point positioning. When the data of the item "positioning scheme" is not the "two-point" (Act 26, NO), the processor 51 returns to Act 22. That is, the processor 51 further counts up the first addition counter n by "1". Then, the processor 51 performs the processes after Act 23 again.

In Act 26, when the data of the item "positioning scheme" is the "two-point" (Act 26, YES), the processor 51 detects a map code, which is data of the item "map code", from the n-th data record in Act 27. In Act 28, the processor 51 checks whether the analysis table 521 including the map code exists in the main memory 52. When the analysis table 521 does not exist in the main memory 52 (Act 28, NO), the processor 51 generates the analysis table 521 including the map code in a part of the main memory 52 in Act 29. When the analysis table 521 exists in the main memory 52 (Act 28, YES), the processor 51 skips the process of Act 29. Then, the processor 51 performs processes of Act 31 to Act 42 illustrated in FIG. 8 by using the analysis table 521 stored with the map code.

That is, in Act 31, the processor 51 detects a beacon ID, which is data of the item "beacon ID" from the n-th data record, and sets the beacon ID in the field F11 as a target ID of the analysis table 521. That is, the beacon ID of the n-th data record becomes the target ID. In Act 32, the processor 51 detects an adjacent ID, which is data of the item "adjacent ID" from the n-th data record, and sets the adjacent ID in the field F12 as the adjacent setting ID of the analysis table 521. That is, the adjacent ID of the n-th data record becomes the adjacent setting ID. In such a case, when a plurality of adjacent IDs exist in the n-th data record, all the adjacent IDs become the adjacent setting IDs.

When the processes of Act 31 and Act 32 are ended, the processor 51 employs the number of adjacent setting IDs as an initial value of a subtraction counter r in Act 33. The subtraction counter r, for example, is formed in the volatile area of the main memory 52.

In Act 34, the processor 51 checks whether a counted value of the subtraction counter r is larger than "0". When the counted value of the subtraction counter r is larger than "0" (Act 34, YES), the processor 51 detects an unprocessed adjacent setting ID from the adjacent setting IDs set in the field F12 of the analysis table 521 in the latest process of Act 32 in Act 35. In Act 36, the processor 51 checks whether the unprocessed adjacent setting ID was set in the field F11 of the analysis table 521 as a target ID. When the unprocessed adjacent setting ID was not set (Act 36, NO), the processor 51 sets the unprocessed adjacent setting ID in the field F13 as the adjacent candidate ID of the analysis table 521 in Act 37. That is, the processor 51 stores the adjacent setting ID as the adjacent candidate ID of the target ID. Then, the processor 51 proceeds to a process of Act 42.

In Act 36, when the unprocessed adjacent setting ID was set in the field F11 of the analysis table 521 as the target ID (Act 36, YES), the processor 51 searches for the field F13 of the analysis table 521 in which the unprocessed adjacent setting ID was set as the target ID in Act 38. In Act 39, the processor 51 checks whether the beacon ID set as the target ID in the process of Act 31 exists in the field F13. When the beacon ID does not exist in the field F13 (Act 39, NO), the processor 51 proceeds to the process of Act 37. That is, the processor 51 stores the unprocessed adjacent setting ID as the adjacent candidate ID of the target ID. Then, the processor 51 proceeds to the process of Act 42.

In Act 39, when the beacon ID set as the target ID exists in the field F13 (Act 39, YES), the processor 51 sets the beacon ID set as the target ID in the field F14 of the analysis table 521, in which the unprocessed adjacent setting ID was set as the target ID, in Act 40. That is, the processor 51 stores the target ID as the adjacent confirmation ID of the unprocessed adjacent setting ID. In Act 41, the processor 51 sets the unprocessed adjacent setting ID in the field F14 of the analysis table 521 in which the target ID was set. That is, the processor 51 stores the unprocessed adjacent setting ID as the adjacent confirmation ID of the target ID. Then, the processor 51 proceeds to the process of Act 42.

In Act 42, the processor 51 subtracts the subtraction counter r by "1". Then, the processor 51 returns to Act 34. That is, the processor 51 checks whether the subtraction counter r is larger than "0". When the subtraction counter r is larger than "0" (Act 34, YES), the unprocessed adjacent setting ID exists in the adjacent setting IDs set in the field F12 in the process of Act 32. Accordingly, the processor 51 performs the aforementioned processes of Act 35 to Act 42 again.

Figure 7:
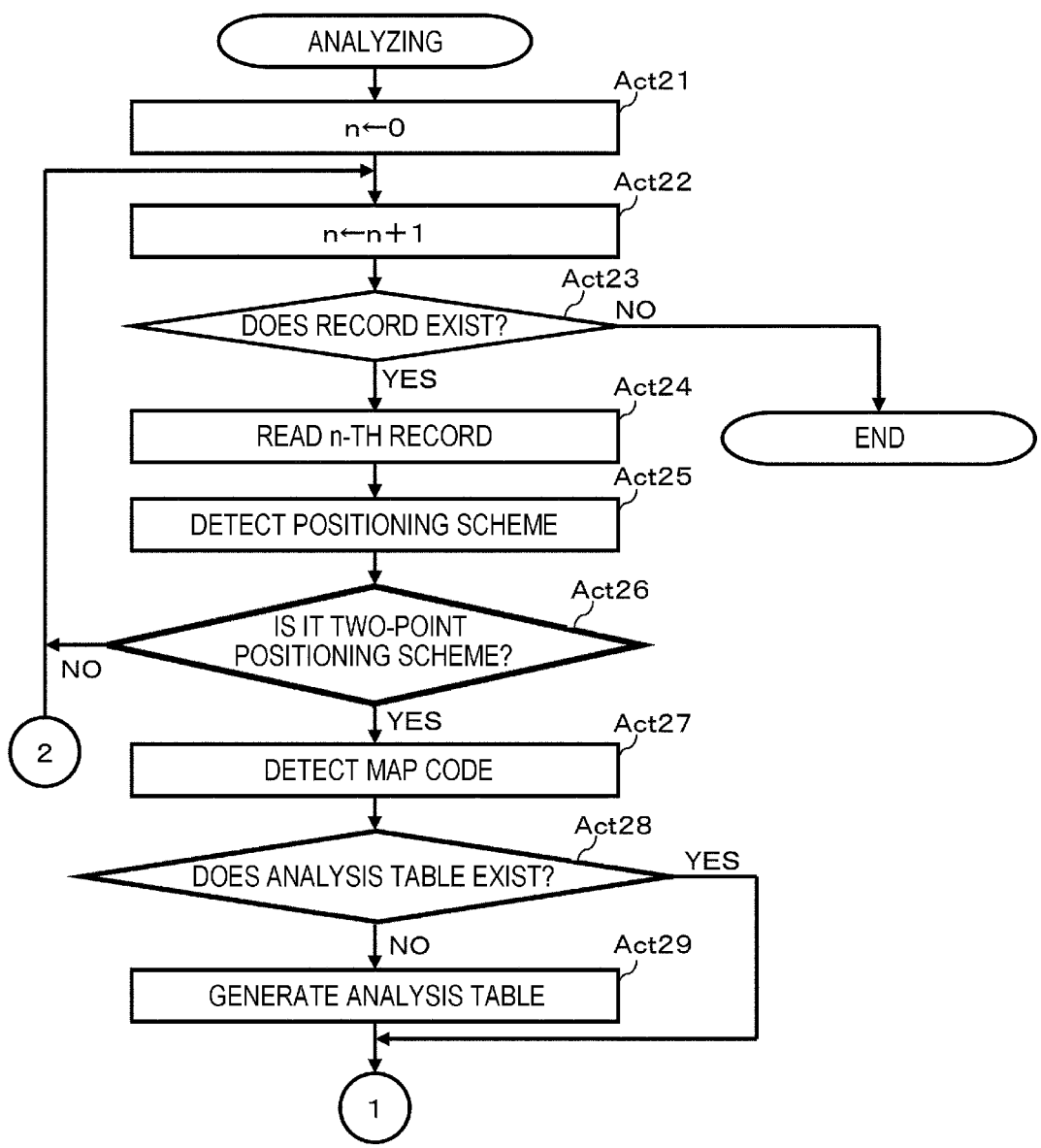
FIG. 7 is a flowchart illustrating a detailed procedure of analyzing in FIG. 6.
Figure 8:
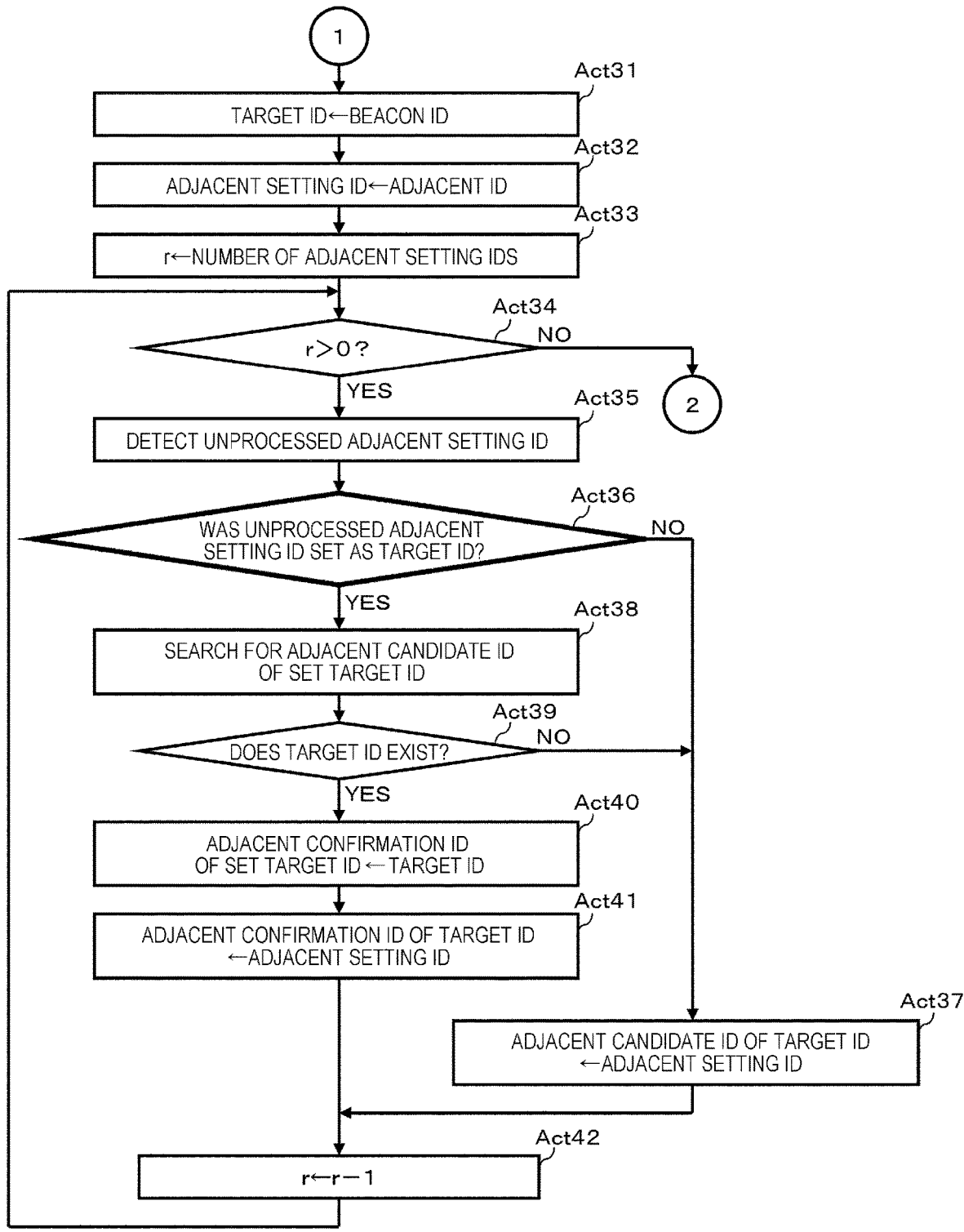
FIG. 8 is a flowchart illustrating the detailed procedure of analyzing.

In Act 34, when the subtraction counter r is "0" (Act 34, NO), the processor 51 proceeds to the process of Act 22 of FIG. 7. That is, the processor 51 counts up the first addition counter n by "1". Then, the processor 51 performs the aforementioned processes after Act 23 again. That is, the processor 51 repeatedly performs the processes of Act 25 to Act 29 and Act 31 to Act 42 whenever reading the n-th data record from the base station file 31. Then, when the processes after Act 24 are completely performed for all data records of the base station file 31 (Act 23, NO), the processor 51 ends the analyzing.

A computer employing the processor 51 as a central part configures a selection unit by the process of Act 31, configures a detection unit by the process of Act 35, configures a first determination unit by the process of Act 36, configures a storage unit by the process of Act 37, configures a second determination unit by the process of Act 39, and configures a confirmation unit by the processes of Act 40 and Act 41.

Hereinafter, a detailed operation of the analyzing when acquiring the base station file 31 in which the data illustrated in FIG. 2 was set will be described with reference to FIGS. 12 to 17. FIGS. 12 to 17 are schematic diagrams illustrating transition examples of the data stored in the analysis table 521.

When the analyzing is started, the first data record (a record of a beacon ID=B00) d1 is first read from the base station file 31. Then, a map code MAP 1 is detected from the data record d1. At the time point, the analysis table 521 stored with the map code MAP 1 does not exist. Consequently, the analysis table 521 stored with the map code MAP 1 is generated in the main memory 52.

Next, a positioning scheme of the data record d1 is determined. Since the positioning scheme of the data record d1 is "one point" indicating the one-point positioning scheme, the second data record (a record of a beacon ID=B01) d2 is read from the base station file 31. A map code of the data record d2 is MAP 1. The analysis table 521 stored with the map code MAP 1 already exists. A positioning scheme of the data record d2 is "two-point". Consequently, as illustrated in FIG. 12, the beacon ID "B01" of the data record d2 is set in the field F11 of the analysis table 521 with which the map code MAP 1 was associated. Furthermore, in the field F12 of the analysis table 521, the adjacent IDs "B02", "B03", and "B05" of the data record d2 are set.

In such a case, all the adjacent setting IDs "B02", "B03", and "B05" are not set as the target ID. Consequently, as illustrated in FIG. 12, the adjacent setting IDs "B02", "B03", and "B05" are all set in the field F13 of the analysis table 521.

Next, the third data record (a record of a beacon ID=B02) d3 is read from the base station file 31. A map code of the data record d3 is MAP 1 and a positioning scheme is "two-point". Consequently, as illustrated in FIG. 13, the beacon ID "B02" of the data record d3 is set in the field F11 of the analysis table 521 stored with the map code MAP 1. Furthermore, in the field F12 of the analysis table 521, the adjacent ID "B01" of the data record d3 is set.

In such a case, the adjacent setting ID "B01" is set as the target ID. In the field F13 of the analysis table 521 in which the adjacent setting ID "B01" was set as the target ID, the beacon ID "B02" exists. Consequently, as illustrated in FIG. 13, in the field F14 of the analysis table 521 in which the adjacent setting ID "B01" was set as the target ID, the beacon ID "B02" is set. Furthermore, in the field F14 of the analysis table 521 in which the beacon ID "B02" was set, the adjacent setting ID "B01" is set.

Next, the fourth data record (a record of a beacon ID=B03) d4 is read from the base station file 31. A map code of the data record d4 is MAP 1 and a positioning scheme is "two-point". Consequently, as illustrated in FIG. 14, the beacon ID "B03" of the data record d4 is set in the field F11 of the analysis table 521 stored with the map code MAP 1. Furthermore, in the field F12 of the analysis table 521, the adjacent ID "B04" of the data record d4 is set.

In such a case, the adjacent setting ID "B04" is not set as the target ID. Consequently, as illustrated in FIG. 14, the adjacent setting ID "B04" is set in the field F13 of the analysis table 521.

Next, the fifth data record (a record of a beacon ID=B04) d5 is read from the base station file 31. A map code of the data record d5 is MAP 1 and a positioning scheme is "two-point". Consequently, as illustrated in FIG. 15, the beacon ID "B04" of the data record d5 is set in the field F11 of the analysis table 521 stored with the map code MAP 1. Furthermore, in the field F12 of the analysis table 521, the adjacent IDs "B03" and "B05" of the data record d5 are set.

In such a case, the adjacent setting ID "B03" is set as the target ID. Furthermore, in the field F13 of the analysis table 521 in which the adjacent setting ID "B03" was set as the target ID, the beacon ID "B04" exists. Consequently, as illustrated in FIG. 15, in the field F14 of the analysis table 521 in which the adjacent setting ID "B03" was set as the target ID, the beacon ID "B04" is set. Furthermore, in the field F14 of the analysis table 521 in which the beacon ID "B04" was set, the adjacent setting ID "B03" is set.

On the other hand, the adjacent setting ID "B05" is not set as the target ID. Consequently, as illustrated in FIG. 15, the adjacent setting ID "B05" is set in the field F13 of the analysis table 521.

Next, the sixth data record (a record of a beacon ID=B05) d6 is read from the base station file 31. A map code of the data record d6 is MAP 1 and a positioning scheme is "two-point". Consequently, as illustrated in FIG. 16, the beacon ID "B05" of the data record d6 is set in the field F11 of the analysis table 521 stored with the map code MAP 1. Furthermore, in the field F12 of the analysis table 521, the adjacent IDs "B02", "B04", and "B06" of the data record d6 are set.

In such a case, the adjacent setting ID "B02" is set as the target ID. However, in the field F13 of the analysis table 521 in which the adjacent setting ID "B02" was set as the target ID, the beacon ID "B05" does not exist. Consequently, as illustrated in FIG. 16, in the field F14 of the analysis table 521 in which the adjacent setting ID "B02" was set as the target ID, the beacon ID "B05" is not set. Furthermore, in the field F13 of the analysis table 521 in which the beacon ID "B05" was set, the adjacent setting ID "B02" is set.

Furthermore, the adjacent setting ID "B04" is also set as the target ID. In the field F13 of the analysis table 521 in which the adjacent setting ID "B04" was set as the target ID, the beacon ID "B05" exists. Consequently, as illustrated in FIG. 16, in the field F14 of the analysis table 521 in which the adjacent setting ID "B04" was set as the target ID, the beacon ID "B05" is set. Furthermore, in the field F14 of the analysis table 521 in which the beacon ID "B05" was set, the adjacent setting ID "B04" is set.

On the other hand, the adjacent setting ID "B06" is not set as the target ID. Consequently, as illustrated in FIG. 16, the adjacent setting ID "B06" is set in the field F13 of the analysis table 521.

Next, the seventh data record (a record of a beacon ID=B06) d7 is read from the base station file 31. A map code of the data record d7 is MAP 1 and a positioning scheme is "two-point". Consequently, as illustrated in FIG. 17, the beacon ID "B06" of the data record d7 is set in the field F11 of the analysis table 521 stored with the map code MAP 1. Furthermore, in the field F12 of the analysis table 521, the adjacent ID "B05" of the data record d7 is set.

In such a case, the adjacent setting ID "B05" is set as the target ID. Furthermore, in the field F13 of the analysis table 521 in which the adjacent setting ID "B05" was set as the target ID, the beacon ID "B06" exists. Consequently, as illustrated in FIG. 16, in the field F14 of the analysis table 521 in which the adjacent setting ID "B05" was set as the target ID, the beacon ID "B06" is set. Furthermore, in the field F14 of the analysis table 521 in which the beacon ID "B06" was set, the adjacent setting ID "B05" is set.

Next, the eighth data record (a record of a beacon ID=B07) d8 is read from the base station file 31. A map code of the data record d8 is MAP 1. However, a positioning scheme is "three-point". Consequently, the ninth data record (a record of a beacon ID=B08) d9 is read from the base station file 31. Also in the data record d9, a positioning scheme is "three-point". Consequently, the tenth data record is read from the base station file 31. Herein, it is assumed that there was no tenth data record in the base station file 31. In such a case, the operation of the analyzing is ended. Thus, the analysis tables 521 according to each map code are stored in the main memory 52 of the evaluation apparatus 5.

Figure 6:
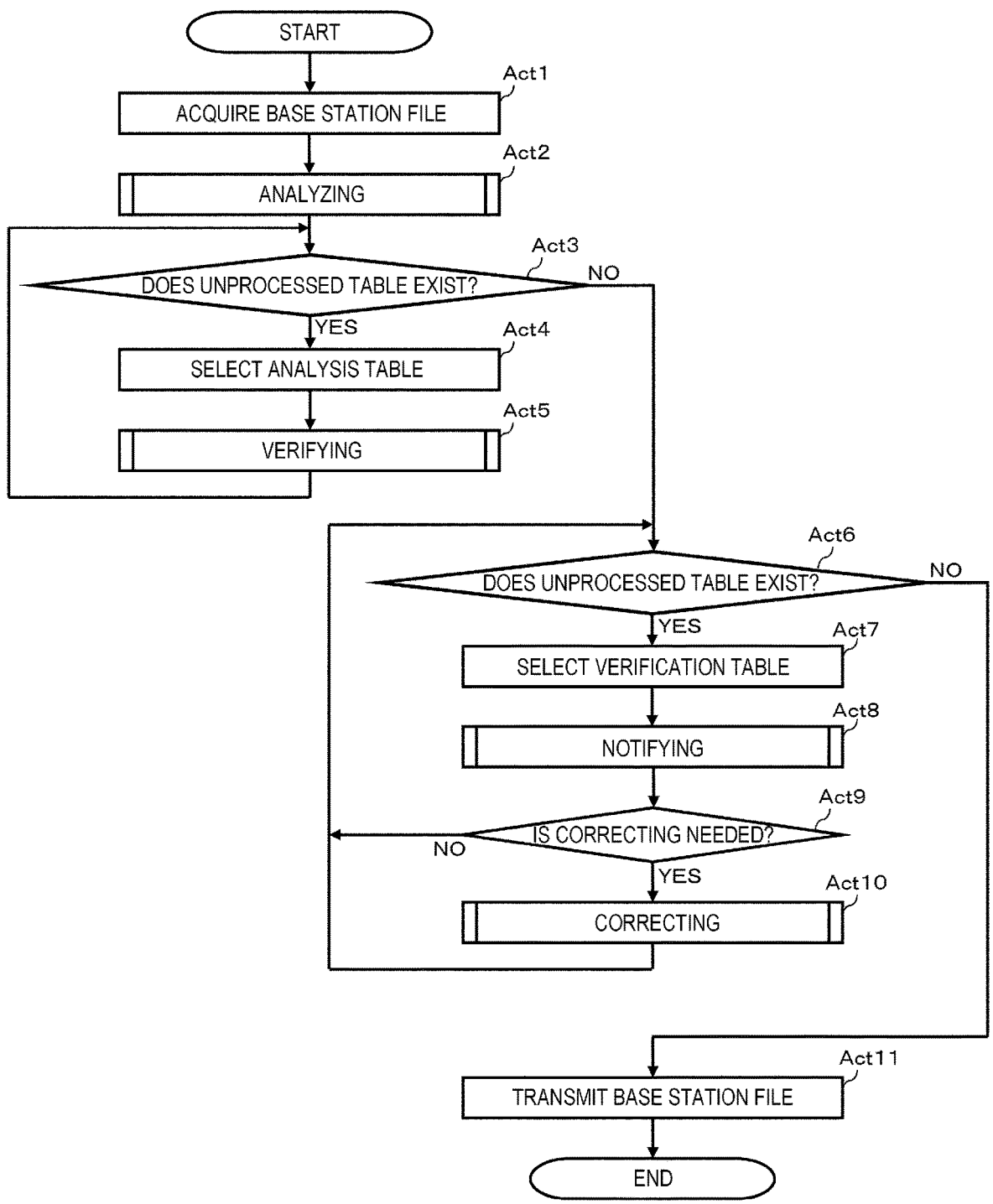
FIG. 6 is a flowchart illustrating a main procedure of information processing performed by a processor of the evaluation apparatus according to a program.

Return to the description of FIG. 6.

When the analyzing is ended, the processor 51 checks whether analysis tables 521, for which verifying to be described later is not processed, exist in the analysis tables 521 according to each map code stored in the main memory 52, in Act 3. When the unprocessed analysis tables 521 exist (Act 3, YES), the processor 51 selects any one analysis table 521 from the unprocessed analysis tables 521 in Act 4. In Act 5, the processor 51 performs the verifying for the selected analysis table 521. A procedure of the verifying will be described with reference to the flowchart of FIG. 9. That is, when the verifying is made, the processor 51 generates the verification table 522 stored with the map code of the selected analysis table 521 in a part of the main memory 52 in Act 51 of FIG. 9. In Act 52, the processor 51 resets the first addition counter n to "0".

In Act 53, the processor 51 counts up the first addition counter n by "1". In Act 54, the processor 51 checks whether an n-th (n is the counted value of the first addition counter n) data record exists in the analysis table 521. The data record is configured with each data of the items "target ID", "adjacent setting ID", "adjacent candidate ID", and "adjacent confirmation ID".

When the n-th data record exists in the analysis table 521 (Act 54, YES), the processor 51 reads the n-th data record in Act 55. In Act 56, the processor 51 stores the number of beacon IDs set in the field F13 of the item "adjacent candidate ID" in a register A from the data record. In Act 57, the processor 51 resets a second addition counter m to "0". The second addition counter m, for example, is formed in the volatile area of the main memory 52.

In Act 58, the processor 51 counts up the second addition counter m by "1". In Act 59, the processor 51 checks whether the counted value of the second addition counter m is equal to or less than the value of the register A.

When the counted value of the second addition counter m is equal to or less than the value of the register A (Act 59, YES), the processor 51 sets a beacon ID, which was set in the item "target ID" of the n-th data record, in the field F21 as the first ID of the verification table 522 in Act 60. In Act 61, the processor 51 sets an m-th (m is the counted value of the second addition counter m) beacon ID of the beacon IDs, which were set in the item "adjacent candidate ID" of the n-th data record, in the field F22 as the second ID of the verification table 522.

In Act 62, the processor 51 checks whether the beacon ID set in the field F22 as the second ID of the verification table 522 coincides with the beacon ID set in the item "adjacent confirmation ID" of the n-th data record. When the beacon IDs do not coincide with each other (Act 62, NO), the processor 51 sets bit data "0" in the field F23 as a bidirectional flag of the verification table 522 in Act 63. In contrast, when the beacon IDs coincide with each other (Act 62, YES), the processor 51 sets bit data "1" in the field F23 as the bidirectional flag of the verification table 522 in Act 64.

When the process of Act 63 or Act 64 is ended, the processor 51 checks whether there is an obstacle on a line connecting a base station 1 specified with the beacon ID set in the field F21 of the verification table 522 and a base station 1 specified with the beacon ID set in the field F22 to each other in Act 65. The presence or absence of the obstacle can be determined from map image data identified with the map codes. When there is no obstacle (Act 65, NO), the processor 51 sets bit data "0" in the field F24 as an error flag of the verification table 522 in Act 66. In contrast, when there is the obstacle (Act 65, YES), the processor 51 sets bit data "1" in the field F24 as the error flag of the verification table 522 in Act 67.

When the process of Act 66 or Act 67 is ended, the processor 51 returns to Act 58. Then, the processor 51 further counts up the second adding counter m by "1" and checks whether the counted value of the second addition counter m is equal to or less than the value of the register A. When the counted value of the second addition counter m is equal to or less than the value of the register A, the m-th beacon ID exists in the item "adjacent candidate ID" of the n-th data record. Accordingly, the processor 51 performs the aforementioned processes of Act 60 to Act 67 again.

By so doing, when the counted value of the second addition counter m exceeds the value of the register A (Act 59, NO), the processor 51 returns to Act 53. That is, the processor 51 further counts up the first adding counter n by "1". Then, the processor 51 checks whether the n-th data record exists in the analysis table 521. When the n-th data record exists, the processor 51 performs the processes after Act 55 again. Then, when the processes after Act 55 are completely performed for all data records of the analysis table 521 (Act 54, NO), the processor 51 ends the verifying.

In such a case, the computer employing the processor 51 as a central part configures a first verification unit by the processes of Act 61 to Act 64 and configures a second verification unit by the processes of Act 65 to Act 67.

Hereinafter, a detailed operation of the verifying when selecting the analysis table 521 in which the data illustrated in FIG. 17 was set will be described with reference to FIGS. 17 and 18. FIG. 18 is a schematic diagram illustrating an example of data stored in the verification table 522.

When the verifying is started, the first data record d11 is first read from the analysis table 521. The number of adjacent candidate IDs of the data record d11 is "3". Consequently, the target ID "B01" of the data record d11 is first set in the field F21 as the first ID of the verification table 522, and the first adjacent candidate ID "B02" is set in the field F22 as the second ID. The adjacent candidate ID "B02" is set in the data record d11 as an adjacent confirmation ID. Consequently, bit data "1" is set in the field F23 as a bidirectional flag. Furthermore, when it is assumed that there is no obstacle on a line connecting a base station 1 specified with the beacon ID "B01" and a base station 1 specified with the beacon ID "B02" to each other, bit data "0" is set in the field F24 as an error flag.

Next, the target ID "B01" of the data record d11 is set in the field F21 as the first ID of the verification table 522, and the second adjacent candidate ID "B03" is set in the field F22 as the second ID. However, the adjacent candidate ID "B03" is not set as an adjacent confirmation ID in the data record d11. Consequently, bit data "0" is set in the field F23 as the bidirectional flag. Furthermore, when it is assumed that there is no obstacle on a line connecting the base station 1 specified with the beacon ID "B01" and a base station 1 specified with the beacon ID "B03" to each other, bit data "0" is set in the field F24 as the error flag.

Next, the target ID "B01" of the data record d11 is set in the field F21 as the first ID of the verification table 522, and the third adjacent candidate ID "B05" is set in the field F22 as the second ID. However, the adjacent candidate ID "B05" is not set as the adjacent confirmation ID in the data record d11. Consequently, bit data "0" is set in the field F23 as the bidirectional flag. Furthermore, when it is assumed that there is an obstacle on a line connecting the base station 1 specified with the beacon ID "B01" and a base station 1 specified with the beacon ID "B05" to each other, bit data "1" is set in the field F24 as the error flag.

Next, the second data record d12 is read from the analysis table 521. The number of adjacent candidate IDs of the data record d12 is "0". Consequently, no data processing is performed for the verification table 522.

Next, the third data record d13 is read from the analysis table 521. The number of adjacent candidate IDs of the data record d13 is "1". Consequently, the target ID "B03" of the data record d13 is set in the field F21 as the first ID of the verification table 522, and the adjacent candidate ID "B04" is set in the field F22 as the second ID. The adjacent candidate ID "B04" is set as an adjacent confirmation ID in the data record d13. Consequently, bit data "1" is set in the field F23 as the bidirectional flag. Furthermore, when it is assumed that there is no obstacle on a line connecting the base station 1 specified with the beacon ID "B03" and a base station 1 specified with the beacon ID "B04" to each other, bit data "0" is set in the field F24 as the error flag.

Next, the fourth data record d14 is read from the analysis table 521. The number of adjacent candidate IDs of the data record d14 is "1". Consequently, the target ID "B04" of the data record d14 is set in the field F21 as the first ID of the verification table 522, and the adjacent candidate ID "B05" is set in the field F22 as the second ID. The adjacent candidate ID "B05" is set as an adjacent confirmation ID in the data record d14. Consequently, bit data "1" is set in the field F23 as the bidirectional flag. Furthermore, when it is assumed that there is no obstacle on a line connecting the base station 1 specified with the beacon ID "B04" and the base station 1 specified with the beacon ID "B05" to each other, bit data "0" is set in the field F24 as the error flag.

Next, the fifth data record d15 is read from the analysis table 521. The number of adjacent candidate IDs of the data record d15 is "2". Consequently, the target ID "B05" of the data record d15 is first set in the field F21 as the first ID of the verification table 522, and the first adjacent candidate ID "B02" is set in the field F22 as the second ID. However, the adjacent candidate ID "B02" is not set as an adjacent confirmation ID in the data record d15. Consequently, bit data "0" is set in the field F23 as the bidirectional flag. Furthermore, when it is assumed that there is no obstacle on a line connecting the base station 1 specified with the beacon ID "B05" and the base station 1 specified with the beacon ID "B02" to each other, bit data "0" is set in the field F24 as the error flag.

Next, the target ID "B05" of the data record d15 is set in the field F21 as the first ID of the verification table 522, and the second adjacent candidate ID "B06" is set in the field F22 as the second ID. The adjacent candidate ID "B06" is set as the adjacent confirmation ID in the data record d15. Consequently, bit data "1" is set in the field F23 as the bidirectional flag. Furthermore, when it is assumed that there is no obstacle on a line connecting the base station 1 specified with the beacon ID "B05" and a base station 1 specified with the beacon ID "B06" to each other, bit data "0" is set in the field F24 as the error flag.

Next, the sixth data record d16 is read from the analysis table 521. The number of adjacent candidate IDs of the data record d16 is "0". Consequently, no data processing is performed for the verification table 522. In this way, the verifying for the analysis table 521 selected in Act 4 is ended.

Return to the description of FIG. 6.

When the verifying is ended, the processor 51 returns to Act 3. That is, the processor 51 checks whether the unprocessed analysis tables 521 exists. When the unprocessed analysis tables 521 exists, the processor 51 selects the analysis table 521 and performs the aforementioned verifying again.

By so doing, when the verifying is ended for all the analysis tables 521 stored in the main memory 52 (Act 3, NO), the processor 51 checks whether a verification table 522, for which verifying to be described later is not processed, exists in the verification tables 522 according to each map code stored in the main memory 52, in Act 6. When the unprocessed verification table 522 exists (Act 6, YES), the processor 51 selects any one verification table 522 from the unprocessed verification tables 522 in Act 7. In Act 8, the processor 51 performs notifying for the selected verification table 522. A procedure of the notifying will be described with reference to the flowchart of FIG. 10. That is, when the notifying is made, the processor 51 acquires map image data of a floor identified with the map code of the verification table 522 from the positioning server 3, and allows the display device 55 to display a map image in Act 71 of FIG. 10. In Act 72, the processor 51 resets the first addition counter n to "0".

In Act 73, the processor 51 counts up the first addition counter n by "1". In Act 74, the processor 51 checks whether an n-th (n is the counted value of the first addition counter n) data record exists in the verification table 522. The data record is configured with each data of the items "first ID", "second setting ID", "bidirectional flag", and "error flag".

When the n-th data record exists in the verification table 522 (Act 74, YES), the processor 51 reads the n-th data record in Act 75. In Act 76, the processor 51 checks whether bit data of the item "bidirectional flag" of the data record, a so-called bidirectional flag, is "1".

When the bidirectional flag is "1" (Act 76, YES), the processor 51 acquires image data indicating a line segment with round marks at both ends from the auxiliary storage device 53 in Act 77. Then, the processor 51 controls the display of the map image such that a first base station 1-1 specified with data of the item "first ID" of the data record, a so-called the first beacon ID and a second base station 1-2 specified with data of the item "second ID", a so-called the second beacon ID are connected to each other by the line segment with round marks at both ends.

In contrast, when the bidirectional flag is "0" (Act 76, NO), the processor 51 acquires image data indicating a line segment with an arrow mark at one end from the auxiliary storage device 53 in Act 78. Then, the processor 51 controls the display of the map image such that the first base station 1-1 and the second base station 1-2 are connected to each other by the line segment with an arrow mark at one end. In such a case, it is assumed that the arrow indicates a direction from the first base station 1-1 to the second base station 1-2.

When the process of Act 77 or Act 78 is ended, the processor 51 checks whether bit data of the item "error flag" of the data record, a so-called error flag, is "1" in Act 79. When the error flag is "1" (Act 79, YES), the processor 51 changes a line type of the line segment displayed in the process of Act 77 or Act 78 from a solid line to a broken line in Act 80. For example, the processor 51 acquires image data indicating the line segment with round marks at both ends and having a line type of a broken line or the line segment with an arrow mark at one end and having a line type of a broken line from the auxiliary storage device 53. Then, the processor 51 controls the display of the map image such that the first base station 1-1 and the second base station 1-2 are connected to each other by the line segment of the broken line.

In contrast, when the error flag is "0" (Act 79, NO), the processor 51 skips the process of Act 80. Then, the processor 51 returns to Act 73. Then, the processor 51 further counts up the first addition counter n by "1" and checks whether the n-th data record exists in the verification table 522. When the n-th data record exists, the processor 51 performs the processes after Act 75 again. Then, when the processes after Act 75 are completely performed for all data records of the verification table 522 (Act 74, NO), the processor 51 ends the notifying.

Figures 19, 20:
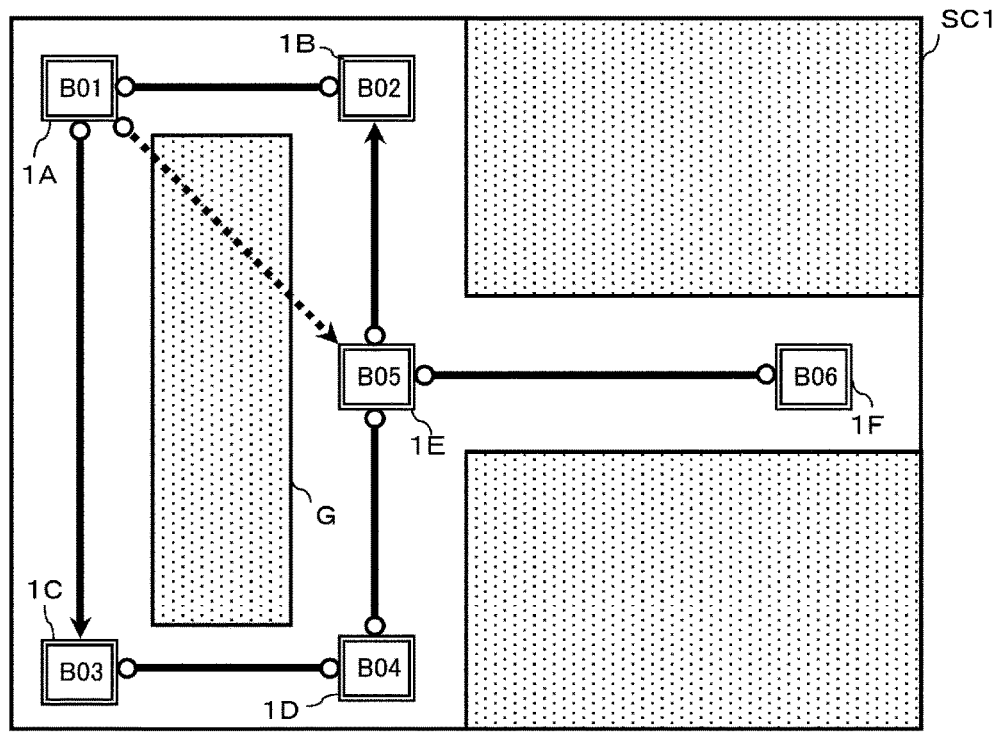
FIG. 19 is a schematic diagram illustrating an example of a map image to be displayed in notifying.
FIG. 20 is a schematic diagram illustrating an example of the base station file after correcting.

An example of a map image SC1 when performing the notifying for the verification table 522 illustrated in FIG. 18 is illustrated in FIG. 19. That is, for a data record d21 having the first ID of "B01" and the second ID of "B02", the bidirectional flag is "1" and the error flag is "0". Consequently, the base station 1A having the beacon ID "B01" and the base station 1B having the beacon ID "B02" are connected to each other by a solid line segment with round marks at both ends.

For a data record d22 having the first ID of "B01" and the second ID of "B03", the bidirectional flag is "0" and the error flag is "0". Consequently, the base station 1A having the beacon ID "B01" and a base station 1C having the beacon ID "B03" are connected to each other by a solid line segment having an arrow indicating a direction from the base station 1A to the base station 1C.

For a data record d23 having the first ID of "B01" and the second ID of "B05", the bidirectional flag is "0" and the error flag is "1". Consequently, the base station 1A having the beacon ID "B01" and a base station 1E having the beacon ID "B05" are connected to each other by a broken line segment having an arrow indicating a direction from the base station 1A to the base station 1E.

For a data record d24 having the first ID of "B03" and the second ID of "B04", the bidirectional flag is "1" and the error flag is "0". Consequently, the base station 1C having the beacon ID "B03" and a base station 1D having the beacon ID "B04" are connected to each other by a solid line segment with round marks at both ends.

For a data record d25 having the first ID of "B04" and the second ID of "B05", the bidirectional flag is "1" and the error flag is "0". Consequently, the base station 1D having the beacon ID "B04" and the base station 1E having the beacon ID "B05" are connected to each other by a solid line segment with round marks at both ends.

For a data record d26 having the first ID of "B05" and the second ID of "B02", the bidirectional flag is "0" and the error flag is "0". Consequently, the base station 1E having the beacon ID "B05" and the base station 1B having the beacon ID "B02" are connected to each other by a solid line segment having an arrow indicating a direction from the base station 1E to the base station 1B.

For a data record d27 having the first ID of "B05" and the second ID of "B06", the bidirectional flag is "1" and the error flag is "0". Consequently, the base station 1E having the beacon ID "B05" and a base station 1F having the beacon ID "B06" are connected to each other by a solid line segment with round marks at both ends.

As described above, the line segment with round marks at both ends is an image indicating that a pair of base stations confirmed by the confirmation unit are the set of the two-point positioning scheme. That is, an operator recognizes that a pair of base stations 1 connected to each other by the line segment with round marks at both ends are correctly set to be the set of the two-point positioning scheme in the base station file 31. In such a case, the computer employing the processor 51 as a central part configures a first notification unit by the process of Act 77.

Furthermore, the line segment with an arrow mark at one end is an image indicating that adjacent candidate base stations are set as partner base stations, which may be the set of the two-point positioning scheme, with respect to base stations as the verification target, but the base stations as the verification target are not set as partner base stations, which may be the set of the two-point positioning scheme, with respect to the adjacent candidate base stations. That is, an operator recognizes that a pair of base stations 1 connected to each other by the line segment with an arrow mark at one end are set as partner base stations, which may be the set of the two-point positioning scheme, in a direction indicated by the arrow, but are not set in an opposite direction. In such a case, the computer employing the processor 51 as a central part configures a second notification unit by the process of Act 78.

Furthermore, the line segment displayed with a broken line is an image indicating that adjacent candidate base stations may not be the set of the two-point positioning scheme with respect to base stations as the verification target. That is, an operator recognizes that improper setting is performed for a pair of base stations 1 connected to each other by the broken line segment. In such a case, the computer employing the processor 51 as a central part configures a third notification unit by the process of Act 80.

Return to the description of FIG. 6.

When the notifying is ended, the processor 51 checks whether correcting is instructed to be performed in Act 9. An operator having checked the map image SC1 determines whether there is an error in the setting of the base station file 31 from the type of the line segment. When there is no error, the operator operates the input device 54 to instruct the ending of the notifying. In contrast, when there is an error, the operator operates the input device 54 to instruct the execution of the correcting.

Figure 11:
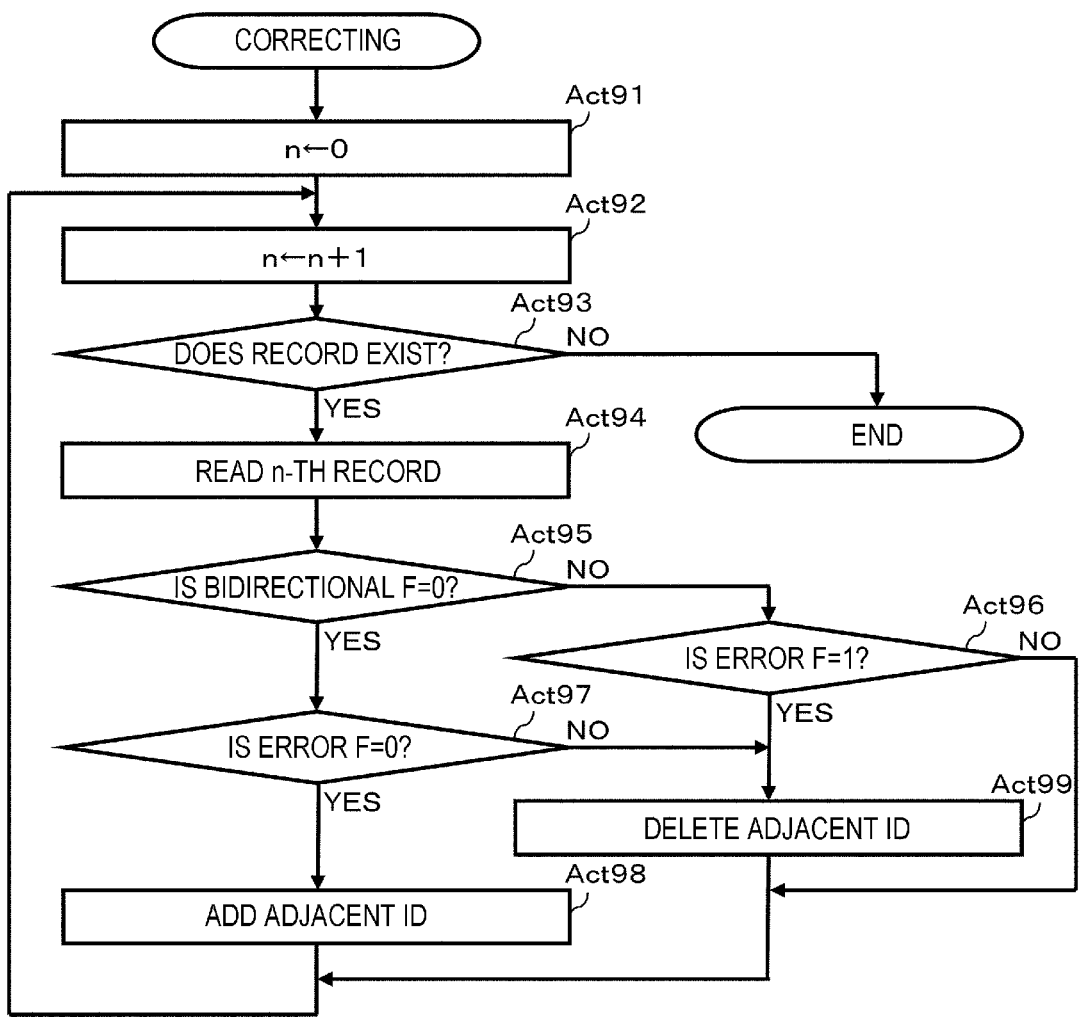
FIG. 11 is a flowchart illustrating a detailed procedure of correcting in FIG. 6.

When it is detected that the execution of the correcting was instructed via the input device 54 (Act 9, YES), the processor 51 performs the correcting in Act 10. The procedure of the correcting will be described with reference to the flowchart of FIG. 11. That is, when the correcting is made, the processor 51 resets the first addition counter n to "0" in Act 91 of FIG. 11.

In Act 92, the processor 51 counts up the first addition counter n by "1". In Act 93, the processor 51 checks whether an n-th (n is the counted value of the first addition counter n) data record exists in the verification table 522.

When the n-th data record exists in the verification table 522 (Act 93, YES), the processor 51 reads the n-th data record in Act 94. In Act 95, the processor 51 checks whether the bidirectional flag of the data record is "0". When the bidirectional flag is "1" (Act 95, NO), the processor 51 checks whether the error flag of the data record is "1" in Act 96. When the error flag is "0" (Act 96, NO), the processor 51 returns to Act 92. In contrast, when the error flag is "1" (Act 96, YES), the processor 51 proceeds to a process of Act 99.

On the other hand, when the bidirectional flag is "0" in Act 95 (Act 95, YES), the processor 51 checks whether the error flag of the data record is "0" in Act 97. When the error flag is "0" (Act 97, YES), the processor 51 proceeds to a process of Act 98. In contrast, when the error flag is "1" (Act 97, NO), the processor 51 proceeds to the process of Act 99.

In Act 98 and Act 99, correcting is performed for the base station file 31 stored in the auxiliary storage device 53. That is, in Act 98, the first ID of the n-th data record is added to the adjacent ID of the data record the base station file 31 in which the second ID of the n-th data record is employed as the beacon ID. In Act 99, the second ID of the n-th data record is deleted from the adjacent ID of the data record the base station file 31 in which the first ID of the n-th data record is employed as the beacon ID.

When the process of Act 98 or Act 99 is ended, the processor 51 returns to Act 92. That is, the processor 51 further counts up the first adding counter n by "1" and checks whether the n-th data record exists in the verification table 522. When the n-th data record exists, the processor 51 performs the aforementioned processes after Act 94 again. Then, when the processes after Act 94 are completely performed for all data records of the verification table 522 (Act 93, NO), the processor 51 ends the correcting.

In such a case, the computer employing the processor 51 as a central part configures a first correction unit by the process of Act 98 and configures a second correction unit by the process of Act 99.

Return to the description of FIG. 6.

In Act 9, when the ending of the notifying is instructed via the input device 54 (Act 9, NO) or when the correcting of Act 10 is ended, the processor 51 returns to Act 6. That is, the processor 51 checks whether the unprocessed verification table 522 exists. When the unprocessed verification table 522 exists, the processor 51 selects the verification table 522 and performs the aforementioned notifying again. Furthermore, when the notifying is instructed to be corrected, the processor 51 performs the aforementioned correcting.

By so doing, when the processes after Act 7 are completely performed for all the verification tables 522 stored in the main memory 52 (Act 6, NO), the processor 51 controls the communication circuit 56 to transmit the base station file 31 stored in the auxiliary storage device 53 to the positioning server 3 in Act 11. By this control, the base station file 31 is transmitted to the positioning server 3 via the network 4 and is overwritten and held in the positioning server 3.

An example of the base station file 31 when performing the correcting for the verification table 522 illustrated in FIG. 18 is illustrated in FIG. 20. That is, the process of Act 98 is performed for a data record d22 having the bidirectional flag "0" and the error flag "0". As a consequence, the first ID "B01" of the data record d22 is added to the data record d4 of the base station file 31, in which the second ID "B03" of the data record d22 is employed as the beacon ID, as an adjacent ID.

Similarly, the process of Act 98 is performed for a data record d26 having the bidirectional flag "0" and the error flag "0". As a consequence, the first ID "B05" of the data record d26 is added to the data record d3 of the base station file 31, in which the second ID "B02" of the data record d26 is employed as the beacon ID, as an adjacent ID.

On the other hand, the process of Act 99 is performed for a data record d23 having the bidirectional flag "0" and the error flag "1". As a consequence, the second ID "B05" of the data record d23 is deleted from the adjacent ID of the data record d2 of the base station file 31 in which the first ID "B01" of the data record d23 is employed as the beacon ID.

Figure 21:
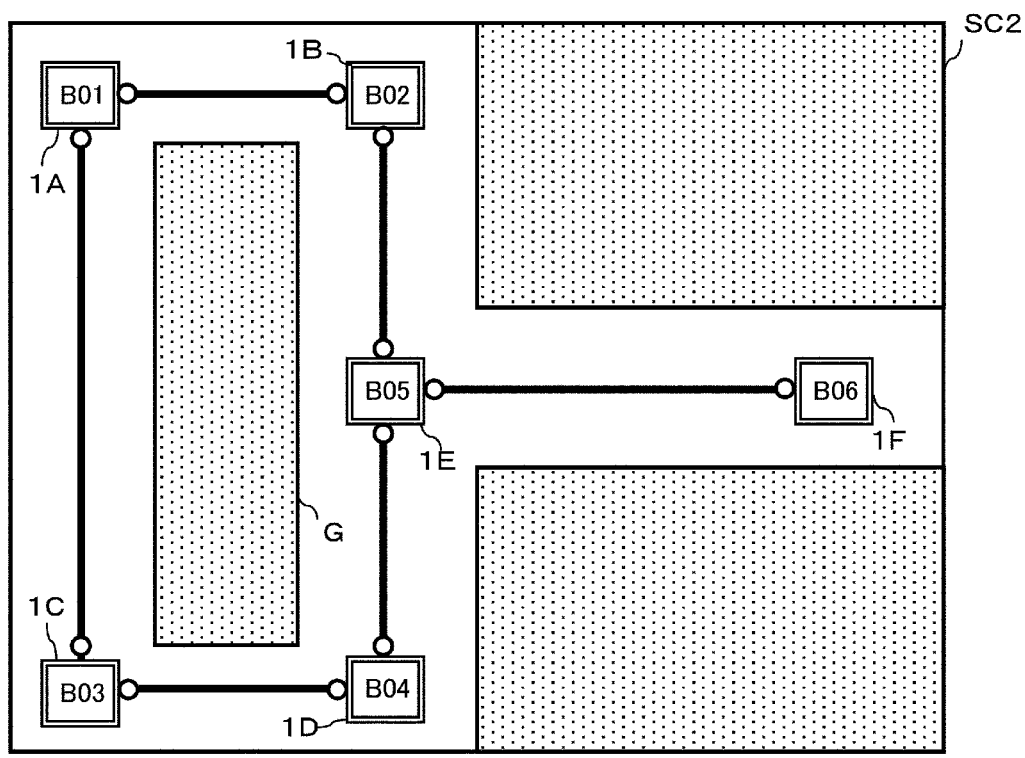
FIG. 21 is a schematic diagram illustrating an example of a map image after correcting.

In addition, an example of a map image SC2 after the evaluation apparatus 5 acquires the base station file 31 illustrated in FIG. 20 and completes the analyzing and the notifying is illustrated in FIG. 21. That is, as apparent from the comparison with FIG. 19, the line segment of the broken line connecting the base station 1A having the beacon ID "B01" and the base station 1E having the beacon ID "B05" to each other is not displayed. Furthermore, the line segment having the arrow connecting the base station 1A having the beacon ID "B01" and the base station 1C having the beacon ID "B03" to each other is changed to a line segment with round marks at both ends. Similarly, the line segment having the arrow connecting the base station 1E having the beacon ID "B05" and the base station 1B having the beacon ID "B02" to each other is changed to a line segment with round marks at both ends. From above, an operator can easily check that consistency of data set with the item "beacon ID" and the item "adjacent ID" of the base station file 31 was made.

As described above, the evaluation apparatus 5 of the present embodiment includes the aforementioned selection unit, detection unit, first determination unit, storage unit, second determination unit, confirmation unit, and first notification unit. Consequently, it is possible to recognize a pair of base stations, in which correct setting was bidirectionally made, with respect to a list in which partner base stations are respectively set, each of which is to be a set of a two-point positioning scheme with a base station, in association with a plurality of base stations. Moreover, the first notification unit allows an image indicating that a pair of base stations confirmed by the confirmation unit are the set of the two-point positioning scheme to be displayed for notification. Consequently, an operator can visually recognize the pair of base stations in which correct setting was bidirectionally made.

Furthermore, the evaluation apparatus 5 includes the aforementioned first verification unit and second verification unit. Consequently, it is possible to recognize a pair of base stations in which insufficient setting was made only in one direction. Moreover, the second verification unit allows an image to be displayed for notification, wherein the image indicates that adjacent candidate base stations are set as partner base stations, which may be the set of the two-point positioning scheme, with respect to base stations as the verification target, but the base stations as the verification target are not set as partner base stations, which may be the set of the two-point positioning scheme, with respect to the adjacent candidate base stations. Consequently, an operator can visually recognize the pair of base stations in which insufficient setting was made only in one direction.

In addition, the evaluation apparatus 5 includes the aforementioned first correction unit. Consequently, when adjacent candidate base stations are not confirmed as a pair of base stations, which are the set of the two-point positioning scheme, with respect to base stations as the verification target, it is possible to automatically correct the list such that the base stations as the verification target become partner base stations, which may be partner base stations of the two-point positioning scheme, with respect to the adjacent candidate base stations.

Furthermore, the evaluation apparatus 5 includes the aforementioned second verification unit and third notification unit. Consequently, for the aforementioned list, it is possible to recognize adjacent candidate base stations which may not be the set of the two-point positioning scheme with respect to base stations as the verification target. Moreover, the third notification unit allows an image to be displayed for notification, wherein the image indicates that the adjacent candidate base stations may not be the set of the two-point positioning scheme with respect to the base stations as the verification target. Consequently, an operator can visually recognize the adjacent candidate base stations which may not be the set of the two-point positioning scheme with respect to the base stations as the verification target.

In addition, the evaluation apparatus 5 includes the aforementioned second correction unit. Consequently, when adjacent candidate base stations may not be the set of the two-point positioning scheme with respect to base stations as the verification target, it is possible to automatically correct the list such that the adjacent candidate base stations are not the partner base stations of the two-point positioning scheme with respect to the base stations as the verification target.

So far, an embodiment of the evaluation apparatus 5 capable of evaluating the consistency of a list in which partner base stations are respectively set, each of which is to be a set of a two-point positioning scheme with a base station, in association with a plurality of base stations was described; however, the embodiment is not limited thereto.

In the embodiment, the base station file 31 to be analyzed from the positioning server 3; however, a unit for acquiring the base station file 31 is not limited thereto. For example, an external storage device provided in the evaluation apparatus 5 may acquire the base station file 31 written in the external storage device by reading the base station file 31.

Figure 9:
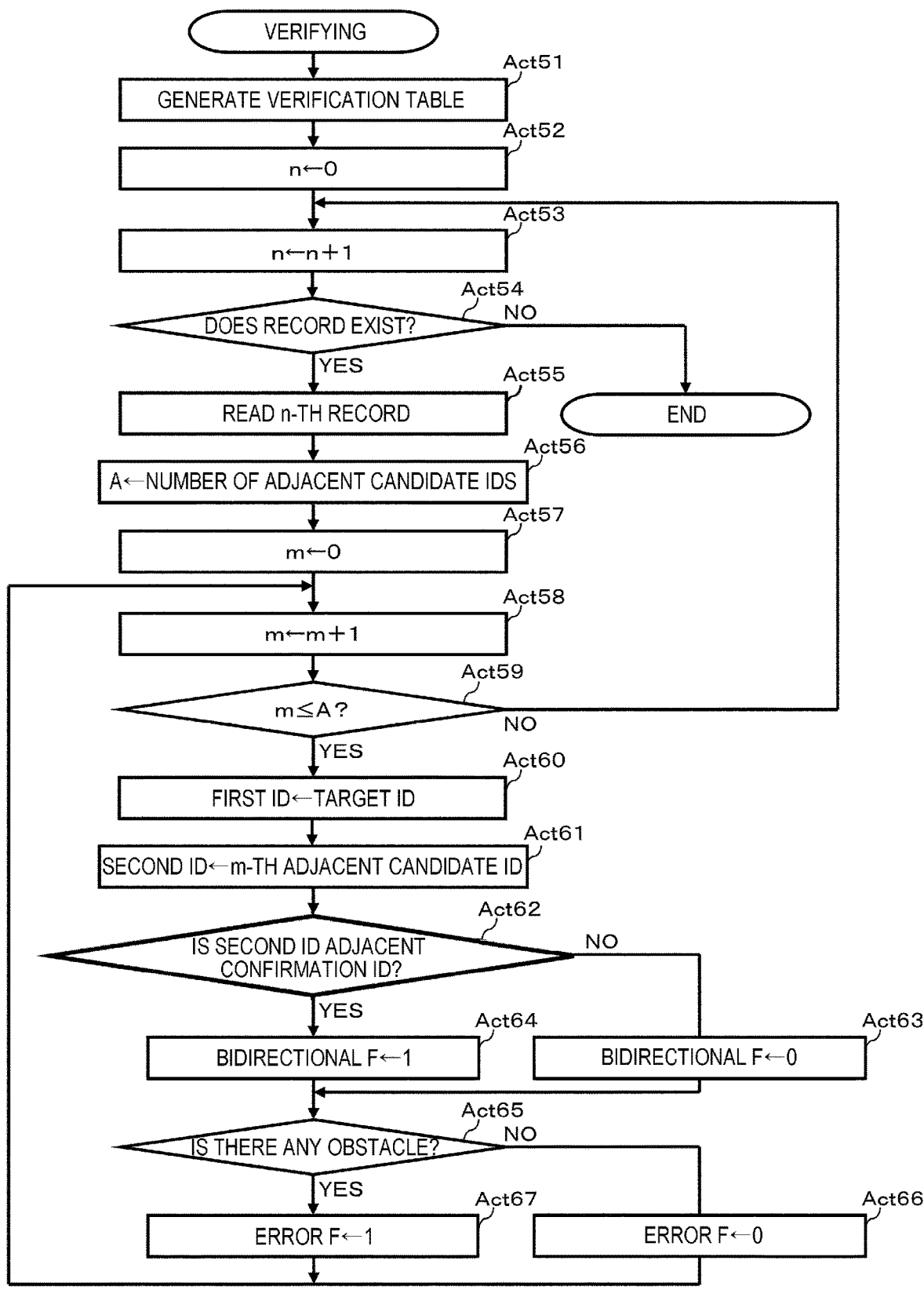
FIG. 9 is a flowchart illustrating a detailed procedure of verifying in FIG. 6.
Figure 10:
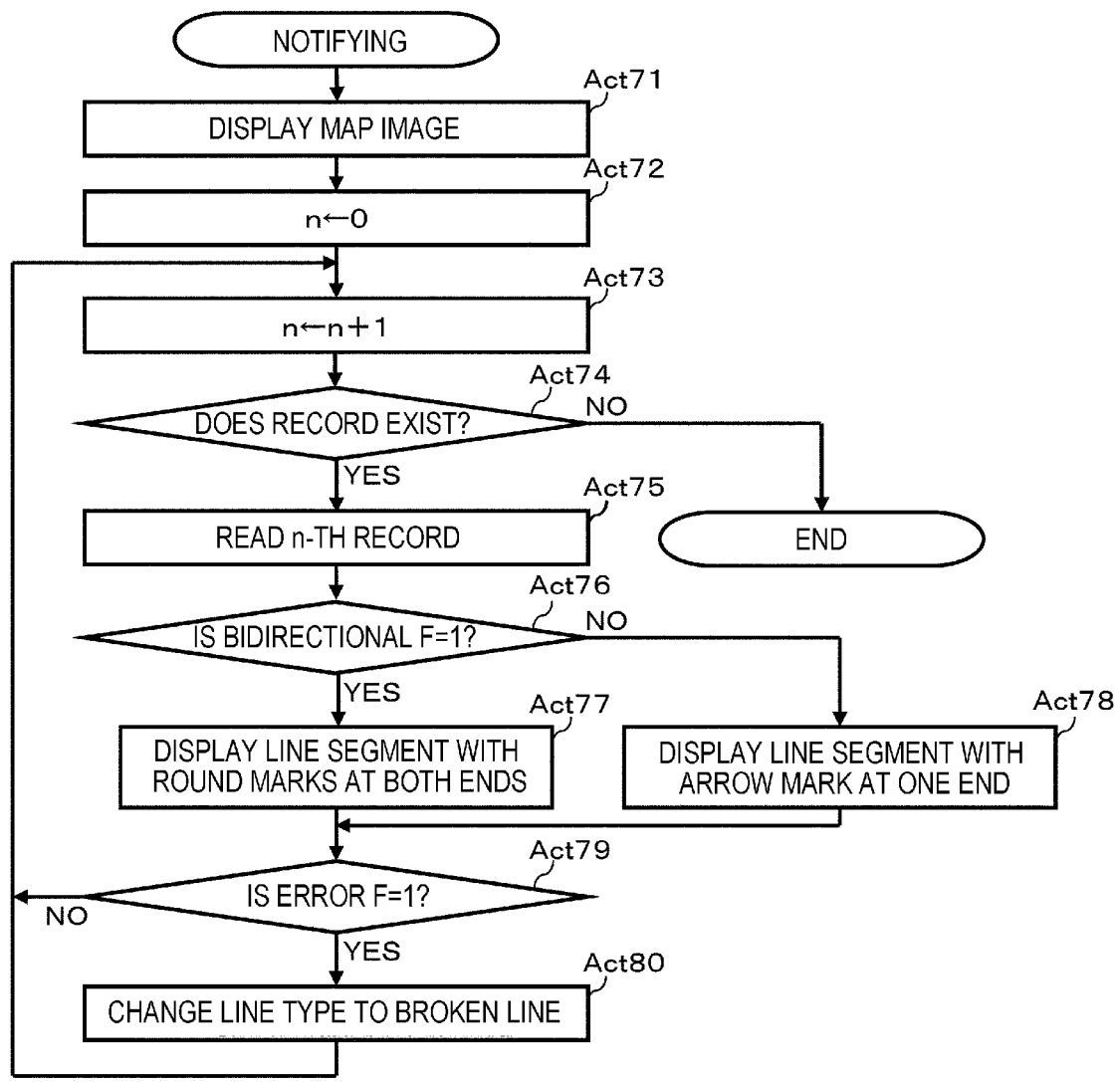
FIG. 10 is a flowchart illustrating a detailed procedure of notifying in FIG. 6.

In the embodiment, in Act 9 of FIG. 9, the execution instruction of the correcting is waited. In other embodiments, the processor 51 may determine whether the correcting is automatically performed. That is, in the verification table 522, when there is a data record having the bidirectional flag "0" or when there is a data record having the error flag "1", the correcting may be automatically performed.

The embodiment exemplifies a case where the first to third notification units allow an image to be displayed for notification. In such a case, the image is not limited to the image of the aforementioned line segment. That is, it is sufficient if the image is an image having content to be notified, which can be understood by an operator. Furthermore, the content may be notified through a method other than an image, for example, sound.

In addition, transfer of the evaluation apparatus 5 is generally performed in a state in which the program described with reference to the flowcharts of FIGS. 6 to 10 was stored in the main memory 52 or the auxiliary storage device 53. However, the embodiment is not limited thereto and the evaluation apparatus 5 may be transferred in a state in which the program was not stored in the main memory 52 or the auxiliary storage device 53. In such a case, the program transferred separately from the evaluation apparatus 5 may be written in a writable storage device, which is provided to the evaluation apparatus 5, according to a user's operation. The transfer of the program can be recorded on a removable storage medium or may be performed through communication via a network. The type of the storage medium is not important if the storage medium can store a program as with a CD-ROM, a memory card and the like and can be read by an apparatus. Furthermore, functions obtained through installation or download of the program may be performed in cooperation with an operating system (OS) in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An evaluation apparatus comprising:
a selection component configured to select a base station as a verification target from a list in which partner base stations are respectively set, each of which is a set of a two-point positioning scheme with the base station, in association with a plurality of base stations installed in an area where a mobile station moves;
a detection component configured to detect the partner base stations, which is the set of the two-point positioning scheme with the base station as the verification target selected by the selection component, from the list;
a first determination component configured to determine whether the partner base stations detected by the detection component are already selected as the base station as the verification target by the selection component;
a storage component configured to store the partner base station as adjacent candidate base stations with respect to the base station as the verification target when the first determination component determines that the detected partner base stations are not selected yet;
a second determination component configured to determine whether the base stations as the verification target are included in the adjacent candidate base stations with respect to the partner base station when the first determination component determines that the detected partner base stations are already selected;
a confirmation component configured to confirm the base station as the verification target and the partner base station, which is determined by the first determination component to be already selected, as a pair of base stations which are the set of the two-point positioning scheme when the second determination component determines that the base station as the verification target is included in the adjacent candidate base stations;
a first notification component configured to notify the pair of base stations confirmed by the confirmation component;
a first verification component configured to verify whether the adjacent candidate base stations stored in the storage component are confirmed as the pair of base stations as the set of the two-point positioning scheme, with respect to the base station as the verification target; and
a second notification component configured to notify the adjacent candidate base stations, which are not confirmed as the pair of base stations serving as the set of the two-point positioning scheme, with respect to the base station as the verification target.

2. The apparatus according to claim 1, wherein the first notification component displays an image, which indicates that the pair of base stations confirmed by the confirmation component are the set of the two-point positioning scheme, on a map image of the area for notification.

3. The apparatus according to claim 1, wherein the second notification component displays an image, which indicates that the adjacent candidate base stations are set as the partner base stations as the set of the two-point positioning scheme, with respect to the base station as the verification target, but the base station as the verification target is not set as the partner base stations as the set of the two-point positioning scheme, with respect to the adjacent candidate base stations, on a map image of the area for notification.

4. The apparatus according to claim 3, further comprising:
a first correction component configured to correct the list such that the base station as the verification target is the partner base station to be the set of the two-point positioning scheme, with respect to the adjacent candidate base stations when the adjacent candidate base stations are not confirmed as the pair of base stations serving as the set of the two-point positioning scheme, with respect to the base station as the verification target as a result of the verification by the first verification component.

5. The apparatus according to claim 1, further comprising:
a first correction component configured to correct the list such that the base station as the verification target is the partner base station to be the set of the two-point positioning scheme, with respect to the adjacent candidate base stations when the adjacent candidate base stations are not confirmed as the pair of base stations serving as the set of the two-point positioning scheme, with respect to the base station as the verification target as a result of the verification by the first verification component.

6. The apparatus according to claim 1, further comprising:
a second verification component configured to verify whether the adjacent candidate base stations stored in the storage component are to be the set of the two-point positioning scheme with respect to the base station as the verification target; and
a third notification component configured to notify the adjacent candidate base stations not to be the set of the two-point positioning scheme, with respect to the base station as the verification target.

7. The apparatus according to claim 6, wherein the third notification component displays an image, which indicates that the adjacent candidate base stations are not to be the set of the two-point positioning scheme with respect to the base station as the verification target, on a map image of the area for notification.

8. The apparatus according to claim 7, further comprising:
a second correction component configured to correct the list such that the adjacent candidate base stations are not the partner base stations of the two-point positioning scheme, with respect to the base station as the verification target when the adjacent candidate base stations are not to be the set of the two-point positioning scheme with respect to the base station as the verification target as a result of the verification of the second verification component.

9. The apparatus according to claim 6, further comprising:
a second correction component configured to correct the list such that the adjacent candidate base stations are not the partner base stations of the two-point positioning scheme, with respect to the base station as the verification target when the adjacent candidate base stations are not to be the set of the two-point positioning scheme with respect to the base station as the verification target as a result of the verification of the second verification component.

10. A method of causing a computer of an evaluation apparatus analyzing a list in which a partner base station, which is to be a set of a two-point positioning scheme with a base station, in association with a plurality of base stations installed in an area where a mobile station moves, to execute functions of:
selecting a base station as a verification target from the list;
detecting the partner base station to be the set of the two-point positioning scheme with the selected base station as the verification target, from the list;
determining whether the detected partner base station is already selected as the base station as the verification target;
allowing a storage unit to store the partner base station as adjacent candidate base stations with respect to the base station as the verification target when the detected partner base station is determined not to be selected yet;
determining whether the base station as the verification target is included in the adjacent candidate base stations with respect to the partner base station when the detected partner base station is already selected;
confirming the base station as the verification target and the partner base station determined to be already selected, as a pair of base stations serving as the set of the two-point positioning scheme when the base station as the verification target is determined to be included in the adjacent candidate base stations;
notifying the pair of confirmed base stations;
verifying, as a first verification, whether the adjacent candidate base stations stored in the storage unit are confirmed as the pair of base stations as the set of the two-point positioning scheme, with respect to the base station as the verification target; and notifying the adjacent candidate base stations, which are not confirmed as the pair of base stations serving as the set of the two-point positioning scheme, with respect to the base station as the verification target.

11. The method according to claim 10, further comprising:

displaying an image, which indicates that the pair of confirmed base stations are the set of the two-point positioning scheme, on a map image of the area for notification.

12. The method according to claim 10, further comprising:

displaying an image, which indicates that the adjacent candidate base stations are set as the partner base stations as the set of the two-point positioning scheme, with respect to the base station as the verification target, but the base station as the verification target is not set as the partner base stations as the set of the two-point positioning scheme, with respect to the adjacent candidate base stations, on a map image of the area for notification.

13. The method according to claim 10, further comprising:

correcting the list such that the base station as the verification target is the partner base station to be the set of the two-point positioning scheme, with respect to the adjacent candidate base stations when the adjacent candidate base stations are not confirmed as the pair of base stations serving as the set of the two-point positioning scheme, with respect to the base station as the verification target as a result of the first verification.

14. The method according to claim 10, further comprising:

verifying, as a second verification, whether the adjacent candidate base stations stored in the storage unit are to be the set of the two-point positioning scheme with respect to the base station as the verification target; and notifying the adjacent candidate base stations not to be the set of the two-point positioning scheme, with respect to the base station as the verification target.

15. The method according to claim 14, further comprising:

displaying an image, which indicates that the adjacent candidate base stations are not to be the set of the two-point positioning scheme with respect to the base station as the verification target, on a map image of the area for notification.

16. The method according to claim 14, further comprising:

correcting the list such that the adjacent candidate base stations are not the partner base stations of the two-point positioning scheme, with respect to the base station as the verification target when the adjacent candidate base stations are not to be the set of the two-point positioning scheme with respect to the base station as the verification target as a result of the second verification.

17. A non-transitory computer readable medium configured to execute, by a processor, functions of:

selecting a base station as a verification target from a list in which a partner base station, which is to be a set of a two-point positioning scheme with a base station, in association with a plurality of base stations installed in an area where a mobile station moves;

detecting the partner base station to be the set of the two-point positioning scheme with the selected base station as the verification target, from the list;

determining whether the detected partner base station is already selected as the base station as the verification target;

allowing a storage unit to store the partner base station as adjacent candidate base stations with respect to the base station as the verification target when the detected partner base station is determined not to be selected yet;

determining whether the base station as the verification target is included in the adjacent candidate base stations with respect to the partner base station when the detected partner base station is already selected;

confirming the base station as the verification target and the partner base station determined to be already selected, as a pair of base stations serving as the set of the two-point positioning scheme when the base station as the verification target is determined to be included in the adjacent candidate base stations;

notifying the pair of confirmed base stations;

verifying, as a first verification, whether the adjacent candidate base stations stored in the storage unit are confirmed as the pair of base stations as the set of the two-point positioning scheme, with respect to the base station as the verification target; and notifying the adjacent candidate base stations, which are not confirmed as the pair of base stations serving as the set of the two-point positioning scheme, with respect to the base station as the verification target.

* * * * *